US012581374B2

(12) United States Patent
Velev et al.

(10) Patent No.: US 12,581,374 B2
(45) Date of Patent: Mar. 17, 2026

(54) BUFFERING AND FORWARDING DATA TRAFFIC

(71) Applicant: Lenovo (Singapore) Pte. Ltd., New Tech Park (SG)

(72) Inventors: Genadi Velev, Darmstadt (DE); Joachim Loehr, Wiesbaden (DE); Prateek Basu Mallick, Dreieich (DE); Ravi Kuchibhotla, Chicago, IL (US); Hyung-Nam Choi, Ottobrunn (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 379 days.

(21) Appl. No.: 18/251,390

(22) PCT Filed: Oct. 29, 2021

(86) PCT No.: PCT/IB2021/060059
§ 371 (c)(1),
(2) Date: May 1, 2023

(87) PCT Pub. No.: WO2022/091039
PCT Pub. Date: May 5, 2022

(65) Prior Publication Data
US 2024/0015612 A1 Jan. 11, 2024

Related U.S. Application Data

(60) Provisional application No. 63/107,373, filed on Oct. 29, 2020.

(51) Int. Cl.
*H04W 36/00* (2009.01)
*H04W 36/02* (2009.01)
*H04W 36/14* (2009.01)

(52) U.S. Cl.
CPC ... *H04W 36/0066* (2013.01); *H04W 36/0033* (2013.01); *H04W 36/023* (2013.01); *H04W 36/14* (2013.01)

(58) Field of Classification Search
CPC . H04W 36/13; H04W 36/08; H04W 36/0033; H04W 36/0016; H04W 36/14;
(Continued)

(56) References Cited

U.S. PATENT DOCUMENTS

| | | | |
|---|---|---|---|
| 2019/0306761 A1* | 10/2019 | Jin | H04W 76/11 |
| 2020/0236594 A1* | 7/2020 | Tang | H04L 41/5051 |
| 2022/0141736 A1* | 5/2022 | Muller | H04W 36/0016 370/331 |

FOREIGN PATENT DOCUMENTS

WO 2020200469 A1 10/2020

OTHER PUBLICATIONS

PCT/IB2021/060059, "Notification of Transmittal of the International Search Report and the Written Opinion of the International Searching Authority, or the Declaration", International Searching Authority, Feb. 11, 2022, pp. 1-17.
(Continued)

*Primary Examiner* — Allahyar Kasraian
(74) *Attorney, Agent, or Firm* — Kunzler Needham & Hilton

(57) ABSTRACT

Apparatuses, methods, and systems are disclosed for remapping traffic between network slices during handover. One apparatus includes a processor and a transceiver that receives a first message indicating that a first connection is not supported in a target RAN. Here, the first connection is established with a first network slice and the first message indicates that buffering-and-forwarding of data traffic of the first connection is supported. The transceiver transmits a request to establish a second connection with a second network slice over the Target RAN and receives a second
(Continued)

message from the Target RAN for establishing the second connection, where the second message includes an identifier of the first connection. The processor communicates at least one buffered data packet of the first connection over the second connection.

18 Claims, 14 Drawing Sheets

(58) Field of Classification Search
CPC .............. H04W 36/12; H04W 36/0011; H04W 36/0072; H04W 36/0066; H04W 36/02; H04W 36/023
See application file for complete search history.

(56) References Cited

OTHER PUBLICATIONS

Huawei, "TP: Xn based mobility for slicing", 3GPP TSG-RAN WG3 Meeting #AH R3-172487, Jun. 27-29, 2017, pp. 1-2.
ZTE et al., "Initial consideration on study of enhancement of RAN Slicing", 3GPP TSG-RAN WG3 #109-e R3-205184, Aug. 17-28, 2020, pp. 1-7.
Ericsson, "TP on Slice Remapping", 3GPP TSG-RAN3#110e Tdoc R3-206434, Nov. 2-13, 2020, pp. 1-7.
3GPP, "3rd Generation Partnership Project; Technical Specification Group RAN; NR; Study on enhancement of Radio Access Network (RAN) slicing (Release 17)", 3GPP TR 38.832 V0.2.0, Sep. 2020, pp. 1-12.

* cited by examiner

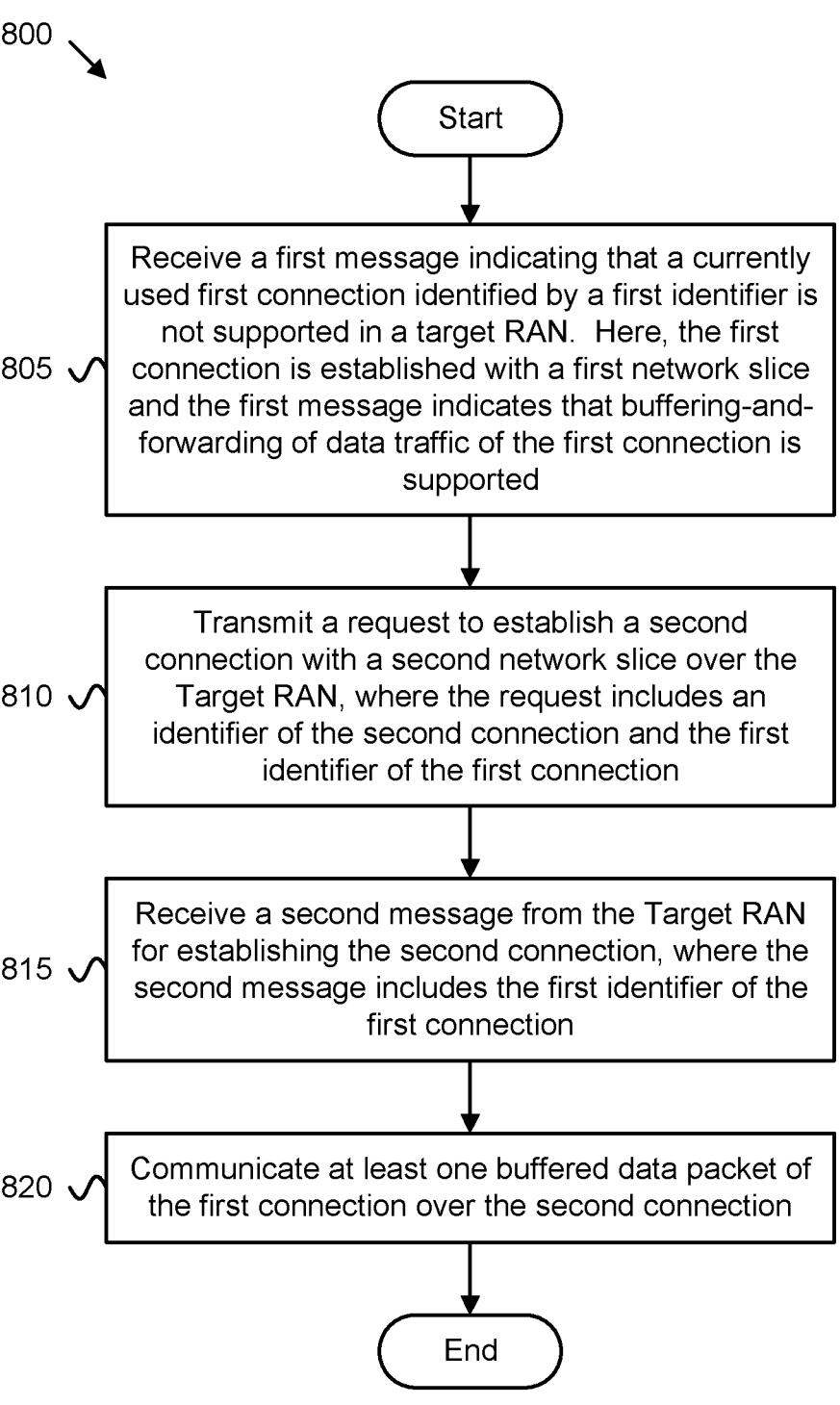

800

Start

805 — Receive a first message indicating that a currently used first connection identified by a first identifier is not supported in a target RAN. Here, the first connection is established with a first network slice and the first message indicates that buffering-and-forwarding of data traffic of the first connection is supported 810 — Transmit a request to establish a second connection with a second network slice over the Target RAN, where the request includes an identifier of the second connection and the first identifier of the first connection 815 — Receive a second message from the Target RAN for establishing the second connection, where the second message includes the first identifier of the first connection 820 — Communicate at least one buffered data packet of the first connection over the second connection End

FIG. 8

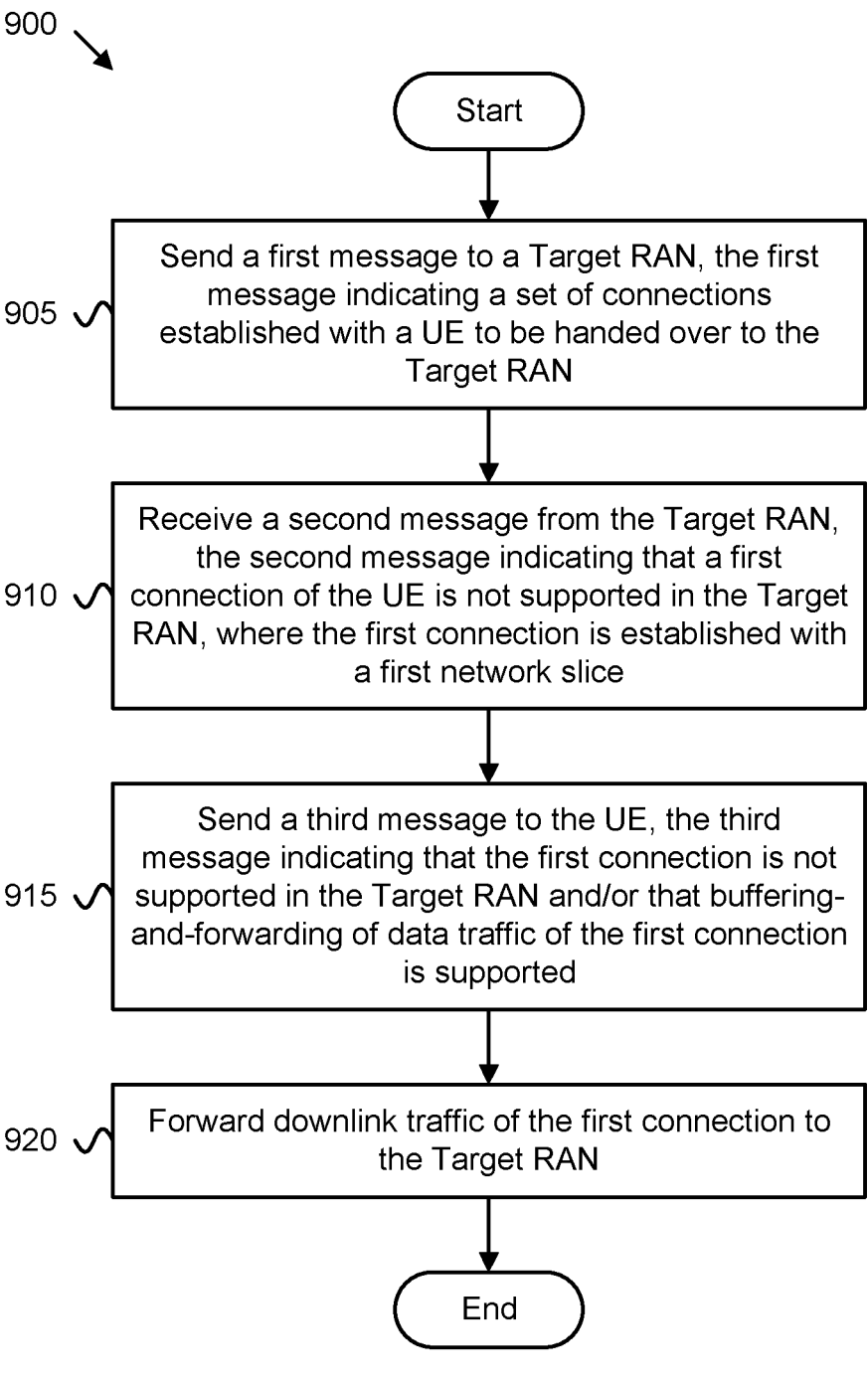

900

Start

905 ⋁ Send a first message to a Target RAN, the first message indicating a set of connections established with a UE to be handed over to the Target RAN 910 ⋁ Receive a second message from the Target RAN, the second message indicating that a first connection of the UE is not supported in the Target RAN, where the first connection is established with a first network slice 915 ⋁ Send a third message to the UE, the third message indicating that the first connection is not supported in the Target RAN and/or that buffering-and-forwarding of data traffic of the first connection is supported 920 ⋁ Forward downlink traffic of the first connection to the Target RAN End

FIG. 9

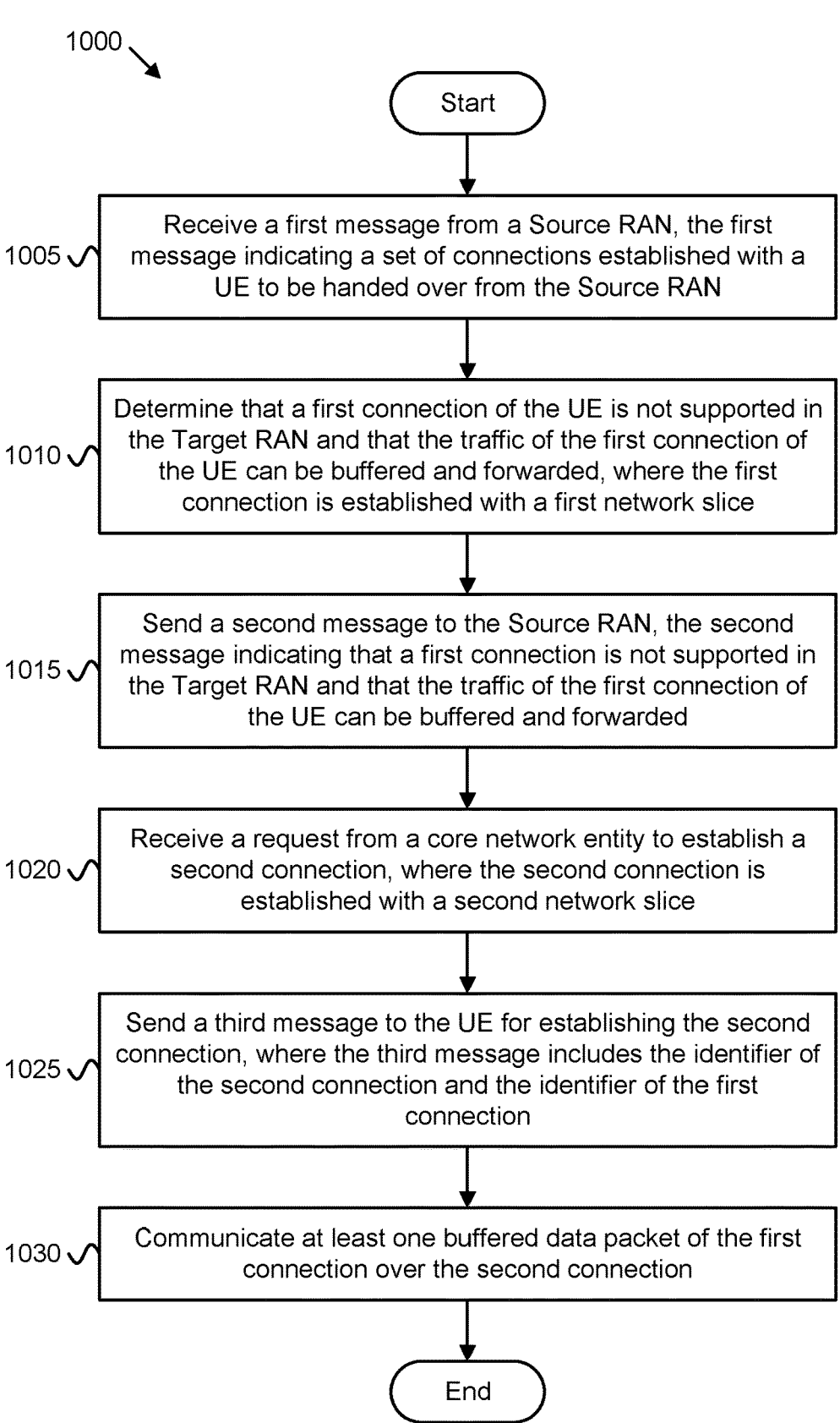

1000

Start

1005 — Receive a first message from a Source RAN, the first message indicating a set of connections established with a UE to be handed over from the Source RAN 1010 — Determine that a first connection of the UE is not supported in the Target RAN and that the traffic of the first connection of the UE can be buffered and forwarded, where the first connection is established with a first network slice 1015 — Send a second message to the Source RAN, the second message indicating that a first connection is not supported in the Target RAN and that the traffic of the first connection of the UE can be buffered and forwarded 1020 — Receive a request from a core network entity to establish a second connection, where the second connection is established with a second network slice 1025 — Send a third message to the UE for establishing the second connection, where the third message includes the identifier of the second connection and the identifier of the first connection 1030 — Communicate at least one buffered data packet of the first connection over the second connection End

FIG. 10

BUFFERING AND FORWARDING DATA TRAFFIC

CROSS-REFERENCE TO RELATED APPLICATIONS

This application claims priority to U.S. Provisional Patent Application No. 63/107,373 entitled "REMAPPING TRAFFIC BETWEEN NETWORK SLICES DURING A HANDOVER" and filed on Oct. 29, 2020 for Genadi Velev, Joachim Loehr, Prateek Basu Mallick, Ravi Kuchibhotla, and Hyung-Nam Choi, which application is incorporated herein by reference.

FIELD

The subject matter disclosed herein relates generally to wireless communications and more particularly relates to remapping traffic between network slices to support service continuity during handover of a User Equipment ("UE") to a target cell which does not support at least one of the UE's currently used network slices.

BACKGROUND

In the current Third Generation Partnership Project ("3GPP") network deployment, it may happen that a UE, which is currently connected to a source cell, is handed over to a target cell which does not support at least one of the network slices currently used by the UE. Under such circumstance, the service(s) for the unsupported network slice(s) are interrupted in the UE.

BRIEF SUMMARY

Disclosed are procedures for remapping traffic between network slices, buffering data traffic of a first network slice during handover, and forwarding data traffic over a second network slice according to the traffic remapping. Said procedures may be implemented by apparatus, systems, methods, or computer program products.

One method of a User Equipment ("UE") for remapping traffic between network slices during handover includes receiving a first message indicating that a currently used first connection identified by a first identifier is not supported in a target Radio Access Network ("RAN"). Here, the first connection is established with a first network slice and the first message indicates that buffering-and-forwarding of data traffic of the first connection is supported. The method includes transmitting a request to establish a second connection with a second network slice over the Target RAN and receiving a second message from the Target RAN for establishing the second connection. Here, the request includes an identifier of the second connection and the first identifier of the first connection and the second message includes the first identifier of the first connection. The method includes communicating at least one buffered data packet of the first connection over the second connection.

One method of a source RAN for remapping traffic between network slices during handover includes sending a first message to a Target RAN, the first message indicating a set of connections established with a UE to be handed over to the Target RAN. The method includes receiving a second message from the Target RAN, the second message indicating that a first connection of the UE is not supported in the Target RAN, where the first connection is established with a first network slice. The method includes sending a third message to the UE, the third message indicating that the first connection is not supported in the Target RAN and/or that buffering-and-forwarding of data traffic of the first connection is supported. The method includes forwarding downlink traffic of the first connection to the Target RAN.

One method of a target RAN for remapping traffic between network slices during handover includes receiving a first message from a Source RAN, the first message indicating a set of connections established with a UE to be handed over from the Source RAN. The method includes determining that a first connection of the UE is not supported in the Target RAN and that the traffic of the first connection of the UE can be buffered and forwarded, where the first connection is established with a first network slice. The method includes sending a second message to the Source RAN, the second message indicating that a first connection is not supported in the Target RAN and that the traffic of the first connection of the UE can be buffered and forwarded. The method includes receiving a request from a core network entity to establish a second connection, where the second connection is established with a second network slice. Here, the request includes an identifier of the second connection and an identifier of the first connection. The method includes sending a third message to the UE for establishing the second connection, where the third message includes the identifier of the second connection and the identifier of the first connection. The method includes communicating at least one buffered data packet of the first connection over the second connection.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a flowchart diagram illustrating one embodiment of a first method for remapping traffic between network slices during handover;

FIG. 9 is a flowchart diagram illustrating one embodiment of a second method for remapping traffic between network slices during handover; and FIG. 10 is a flowchart diagram illustrating one embodiment of a third method for remapping traffic between network slices during handover.

DETAILED DESCRIPTION

Figure 1:
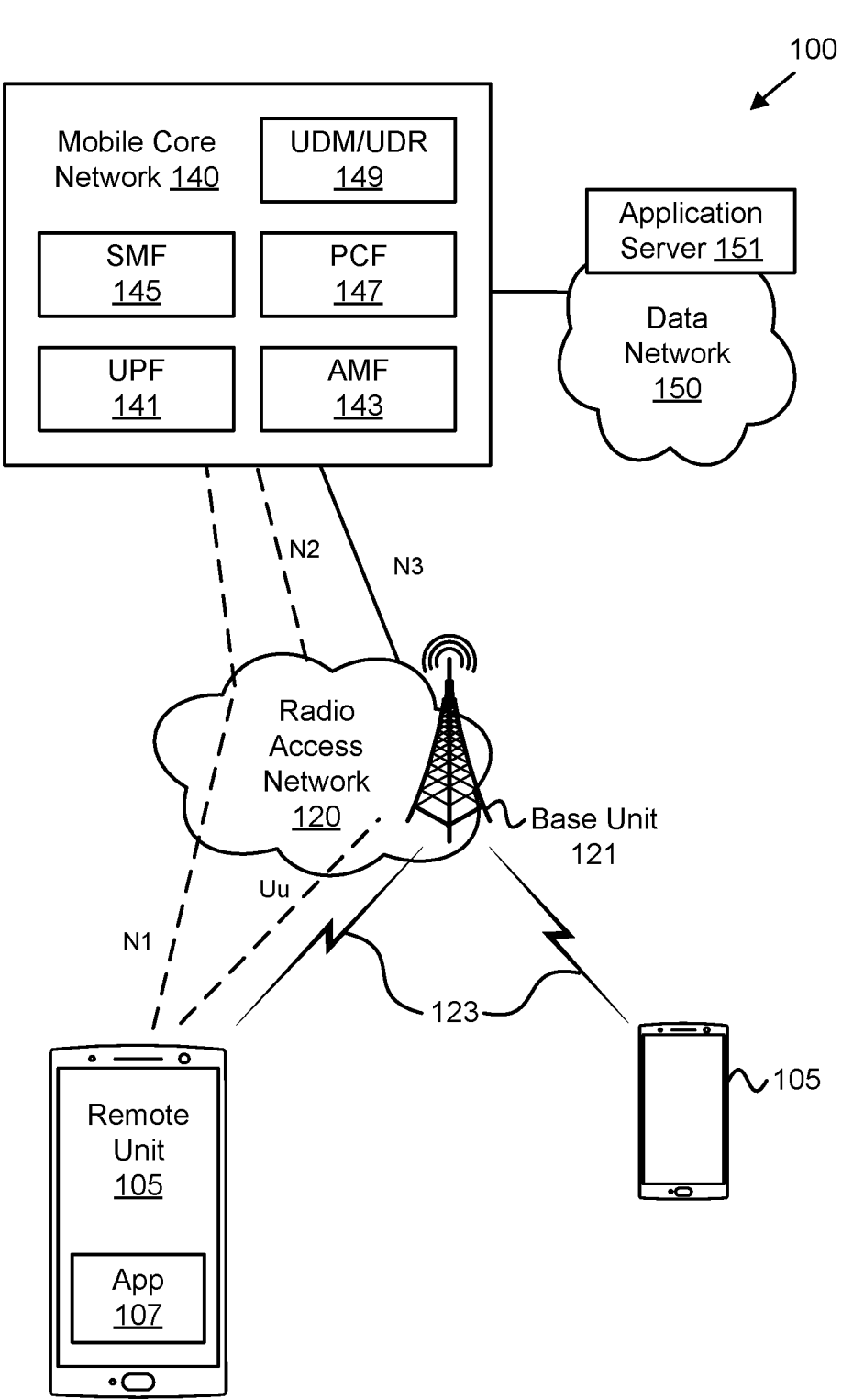
FIG. 1 is a block diagram illustrating one embodiment of a wireless communication system for remapping traffic between network slices during handover.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof"

includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures Like numbers refer to like elements in all figures, including alternate embodiments of like elements.

Generally, the present disclosure describes systems, methods, and apparatus for minimizing the impact (e.g., packet loss) of handover to a target cell which does not support a currently used network slice of the source cell, but where the target cell does support an alternative (i.e., third) network slice. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Currently for a 5G core network ("5GC"), at the time of handover, the Core Network ("CN") includes in the Next Generation ("NG") Handover Request message the current Protocol Data Unit ("PDU") Session, the associated Single Network Slice Selection Assistance Information ("S-NSSAI") and also the list of S-NSSAI(s) to which this PDU session can be re-mapped. An example of per PDU session policy is as follows:

UE 1, PDU Session #1, S-NSSAI #1↔re-mapped list (S-NSSAI #10, S-NSSAI #11)

UE 1, PDU Session #2, S-NSSAI #1↔re-mapped list (S-NSSAI #12, S-NSSAI #14)

UE 2, PDU Session #3, S-NSSAI #1↔re-mapped list (S-NSSAI #14, S-NSSAI #15)

Regarding signaling from Source NG-RAN node, when the PDU session is created in the source Next Generation Radio Access Network ("NG-RAN") node, the CN includes in the Next Generation Application Protocol ("NGAP") PDU Session Resource Setup Request message (or the Initial Context Setup Request message or the NG Handover Request message) the S-NSSAI associated with the PDU session and also the list of S-NSSAI(s) to which this PDU session can be re-mapped. At the time of subsequent Xn handover (here, Xn is the interface between two NG-RAN nodes), the source NG-RAN node includes in the Xn Handover Request message the current PDU Session, the associated S-NSSAI and also the list of S-NSSAI(s) to which this PDU session can be mapped.

However, the drawback is that the network (i.e., CN) needs to enhance the CN network functions (e.g., AMF and/or SMF, UPF) to maintain such potential mapping of all PDU Sessions to potentially alternative PDU Sessions. Also, the network provides already extensive configuration to the UE using the UE Route Selection Policy ("URSP") rules and why should not UE based on its needs decide whether and how to use the ongoing unsupported traffic in the target RAN. To remedy the above, the UE and network behavior may be modifies as described below.

Disclosed herein are solutions for remapping traffic between network slices to support service continuity during a UE handover to a target cell which does not support at least one of the UE's currently used network slices. More specifically, modified SMF behavior includes enabling the SMF to receive a linked PDU Session ID (e.g., an old PDU Session ID) and send it to the RAN in N2 Session Management ("SM") message.

Modified behavior impacting the Uu interface (i.e., between the UE and RAN) includes: Data packets of a first connection being buffered and forwarded to a second connection; the UE requesting establishment of the second connection and send a linked identifier ("ID") of the first connection, where the second connection is first in suspended state and after re-configuration, the second connection is used to transmit data.

Modified RAN behavior includes the source RAN retrieving (e.g., from the UE using AS signaling) the information whether & how traffic of existing PDU Session(s) can be mapped to alternative network slice(s). The source RAN node exchanges such information with the target RAN node (e.g., during handover preparation phase).

FIG. 1 depicts a wireless communication system 100 for remapping traffic between network slices during handover, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle onboard computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Spectrum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) Internet Protocol ("IP") address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, sub-scriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for remapping traffic between network slices during handover apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station/base unit, but it is replaceable by any other radio access node, e.g., gNB, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for remapping traffic between network slices during handover.

As mentioned previously, it may happen that a UE, which is currently connected to cell-1, is handed over to a target cell (cell-2) which does not support at least one of UE's currently used network slices. For example, the target cell-2 does not support the S-NSSAI #2, which the UE is currently using in cell-1. Under such circumstance, the service(s) for the network slice S-NSSAI #2 are interrupted in the UE.

Figure 2A:
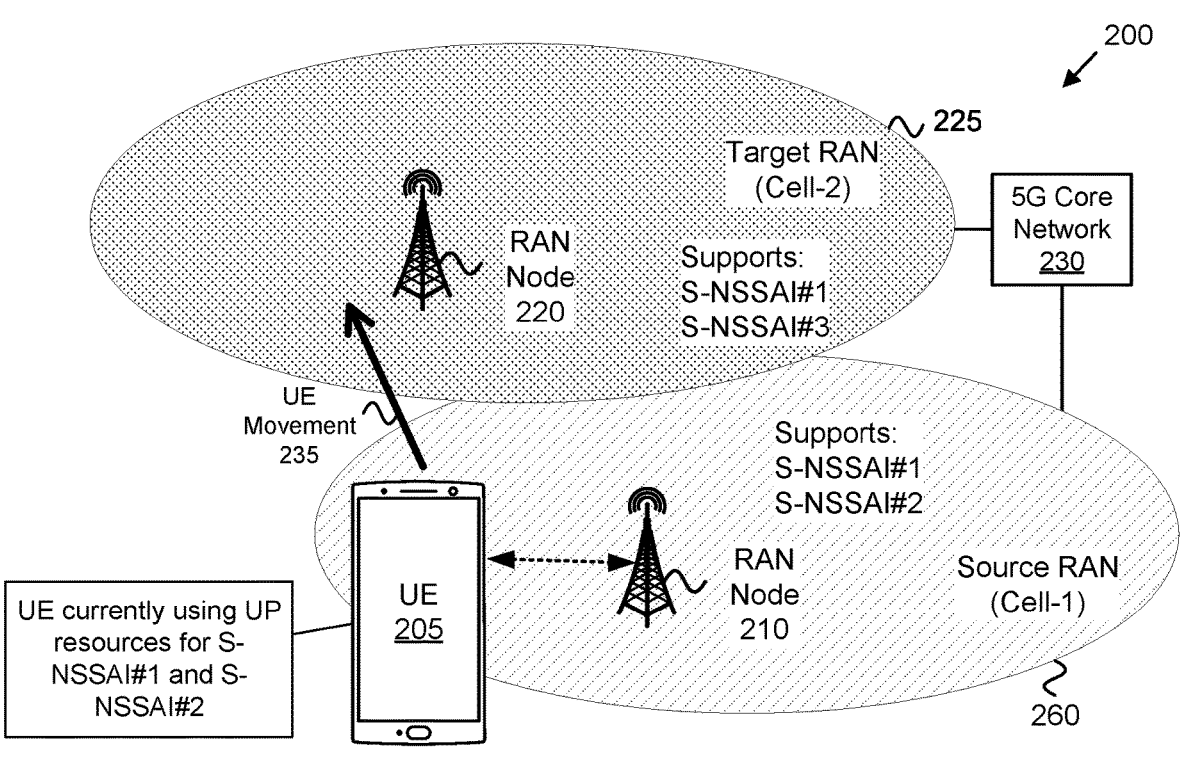
FIG. 2A is a diagram illustrating one embodiment of UE handover to a target cell not supporting all currently used network slices in the source cell.

FIG. 2A depicts a handover 200 of a UE 205 from a first RAN node 210 in a source RAN 215 to a second RAN node 220 in a target RAN 225, where the target cell does not support all currently used network slices in the source cell. The handover 200 involves the UE 205, the first RAN node 210, the source RAN 215, the second RAN node 220, the target RAN 225, an AMF 301, a first network slice 303 comprising a first SMF (denoted "SMF1") 305 and a first UPF (denoted ("UPF1") 307, and a second network slice 309 comprising a second SMF (denoted "SMF2") 311 and a second UPF (denoted ("UPF2") 313. The AMF 301 may be one embodiment of the AMF 143, the SMF1 305 and SMF2 311 may be embodiments of the SMF 145, and the UPF1 307 and UPF2 313 may be embodiments of the UPF 141.

Due to movement 235 of the UE 205, a handover from first RAN node 210 (i.e., Cell-1) to the second RAN node 220 (i.e., Cell-2) may be required. In the depicted embodiment, the UE 205 is currently using UP resources for two different network slices, here identified as S-NSSAI #1 and S-NSSAI #2. However, the target Cell-2 does not support the S-NSSAI #2, which the UE 205 is currently using in Cell-1. Note that target Cell-2 does support a different network slice, here identified as S-NSSAI #3.

It is assumed that the UE 205 is configured with UE route selection policy ("URSP") rules which control how an application may be mapped to a network slice (identified by an S-NSSAI) and data network name ("DNN"). Table 1 shows one example for URSP rules, which include traffic descriptor with respect to which network slice to use:

TABLE 1

|  | Example Network Slice Selection Policy ("NSSP") of the URSP rules |
| --- | --- |
| URSP rule | Application to slice mapping |
| Rule#1 | Match-all: slice1 (Means that Applications without a matching rule are mapped to rule#1) |
| Rule#2 | App1: slice4, slice1 |
| Rule#3 | App2: slice2, slice4, slice1 |
| Rule#4 | App3: slice2, slice3 |
| Rule#5 | App5, App6, App7: slice4 |

Some or all of the applications using a network slice (e.g., S-NSSAI #2) may use one or more alternative network slices. The term "alternative network slice" is used to denote other slices which an application may be able to use. Considering the example URSP rules from Table 1, the App2, which currently may use slice2, may use slice4 and slice1 in other areas or cells. In this example, slice4 and slice1 are considered as alternative network slices for the App2.

To support remapping traffic between network slices during handover, the below described solutions allow the traffic handling of a first PDU Session associated with a first network slice to be forwarded and transmitted over a second PDU Session associated with a second network slice. On a high-level, with respect to the access stratum ("AS") layer, the UE and RAN are allowed to transmit and receive data packets (buffered or associated with) from an old PDU Session over a new PDU Session.

Note that a PDU Session belongs to one and only one specific network slice per PLMN, i.e., to a specific S-NS-SAI. Different network slices do not share a PDU Session. Also, an application on the UE can transmit data only over a single PDU Session. The main steps of the solution include at least:

The data packets currently transmitted over a PDU Session associated with a network slice (e.g., S-NSSAI #2), which is not available in the target cell, are buffered and forwarded to a new PDU Session associated with a new network slice (e.g., S-NSSAI #3) in the target RAN. For this purpose, the following features may be implemented to support remapping traffic between network slices during handover: A) the UE and RAN may exchange the capability of lossless traffic re-mapping between different network slices (i.e., a capability to support temporary buffering and forwarding of data traffic); and B) the RAN may retrieve the information (e.g., from the UE) whether traffic of a PDU Session can be re-mapped to alternative (and which exactly) network slice in the current (i.e., serving) PLMN. The source RAN node maintains a list of alternative network slices for activated/used PDU Sessions.

During a handover procedure, the following applies: A) the target RAN indicates that it supports the traffic re-mapping (e.g., re-routing) among network slices; B) the source RAN indicates to the UE which DRB(s) (e.g., DRB #3) may be potentially rejected or suspended in the target RAN and whether traffic re-mapping to alternative network slice is supported; C) the UE creates a suspended bearer corresponding to the rejected bearer; and D) the target RAN also creates a suspended bearer (e.g., DRB #3.1) to buffer the packets which are incoming (e.g., forwarded from the source RAN) for the suspended bearer.

After the completion of the handover procedure, the UE may establish a new PDU Session (e.g., PDU-S-ID #5, in the target area/cell) associated with a network slice different from the network slice in the source cell. The UE may include the PDU Session ID (e.g., PDU-S-ID #3) of the old PDU Session.

In some embodiments, the SMF includes in the N2 SM message for establishing the new PDU Session (e.g., PDU-S-ID #5) also the old PDU-S-ID #3 from which the traffic has to be mapped to the new PDU Session (e.g., PDU-S-ID #5). In some embodiments, the target RAN node re-config-ures the suspended DRB (e.g., DRB #3.1) to be used as the new DRB (DRB #5) for the new PDU Session (e.g., PDU-S-ID #5).

Note that the term "traffic", e.g., in the expressions like "traffic remapping/rerouting between network slices", is meant to represent a type of data packets originating from an application or service. Traffic may correspond to Service Data Flow (SDF) as used in the 3GPP specifications. One or more SDFs may be mapped to a QoS flow. The mapping of SDF to QoS flow is determined in the SMF and executed in the UE (based on "QoS rules" received from the SMF) and in the UPF (based on the "SDF template" received from the SMF).

Figure 2B:
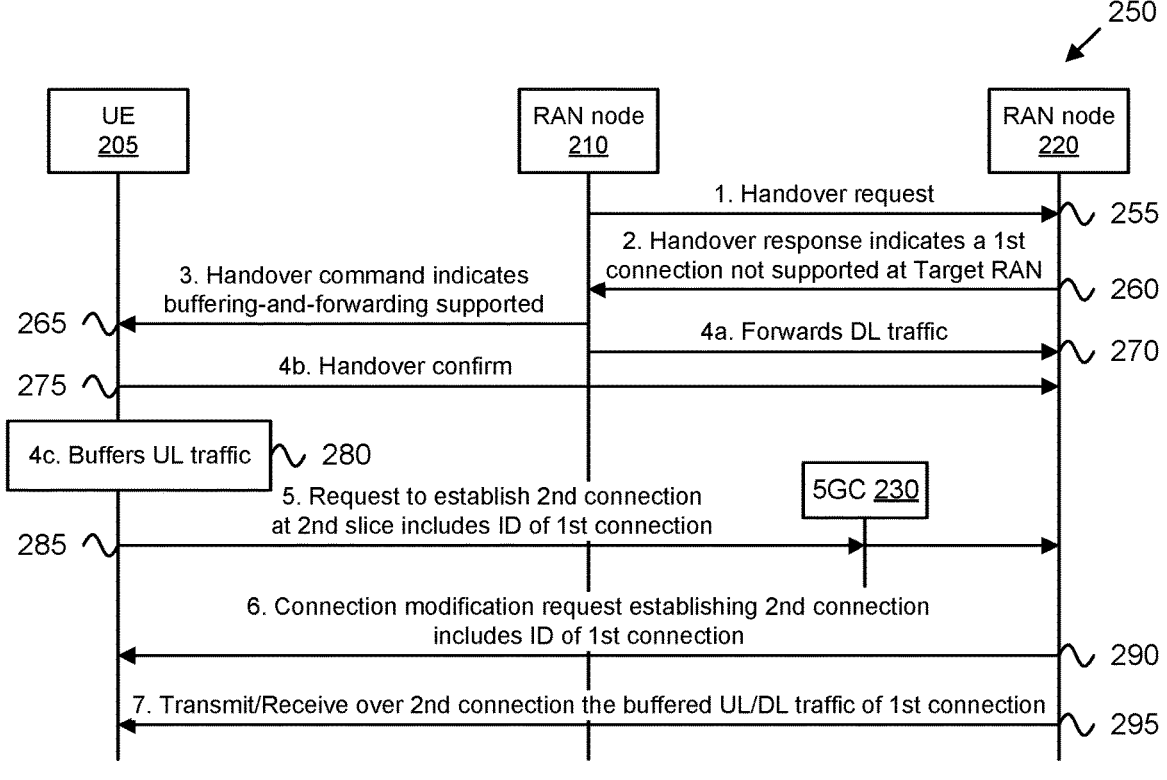
FIG. 2B is a block diagram illustrating one embodiment of a procedure for remapping traffic between network slices during handover.

FIG. 2B depicts a procedure 250 for remapping traffic between network slices during handover, according to embodiments of the disclosure. The procedure 250 involves the UE 205, the first RAN node 210 and the second RAN node 220, and the 5GC 230. A detailed description of the steps in the procedure 250 is as follows:

At Step 1, the RAN node 210 sends a first message (i.e., a handover request) to the RAN node 220 in the Target RAN 225 (see messaging 255). Here, the first message indicates a set of connections established with the UE 205 subject to handover to the RAN node 220. Note that the first message (and also other messages between the RAN node 210 and the RAN node 220) may be transmitted either directly between RAN nodes or indirectly via an AMF.

At Step 2, the RAN node 220 sends a second message (i.e., a handover response) to the RAN node 210 (see messaging 260). Here, the second message indicates that a first connection of the UE is not supported in the Target RAN, the first connection being established with a first network slice. Additionally, the second message may indicate that buffering-and-forwarding of data traffic is supported.

At Step 3, the RAN node 210 sends a third message (i.e., a handover command) to the UE 205 (see messaging 265). Here, the third message indicates support for buffering-and-forwarding of data traffic of the first connection. Additionally, the third message may indicate that the first connection is not supported in the target RAN 225. In one embodiment, the buffering-and-forwarding support indication implicitly signals that the first connection is not supported in the target RAN 225.

to the RAN node 220 in order to complete the handover over the radio interface.

At Step 4, the UE 205 and RAN node 210 begin buffering-and-forwarding of data traffic of the first connection. At Step 4a, after sending the third message (i.e., handover command), the RAN node 210 begins to forward downlink traffic of the first connection to the RAN node 220 (see messaging 270), which buffers the forwarded traffic.

Additionally, at Step 4b the UE sends a fourth message (i.e., handover confirm message) to the RAN node 220 in order to complete the handover over the radio interface (see messaging 275). At Step 4c, after receiving the third message, the UE 205 begins to buffer uplink traffic of the first connection (see block 280).

At Step 5, the UE 205 sends a fifth message (i.e., a connection establishment request) to the 5GC 230 (see messaging 285). Here, the fourth message requests to establish a connection (i.e., the second connection) with a second network slice over the target RAN 225. The fourth message includes an identifier of the second connection and the first identifier of the first connection. Note that the 5GC 230 sends a request to the RAN node 220 to establish the second connection with the UE.

At Step 6, the RAN node 220 sends a fifth message (i.e., connection modification request) to the UE 205 for establishing the second connection (see messaging 290). Here, the fifth message includes the identifier of the second connection and the identifier of the first connection.

At Step 7, having established the second connection, the UE 205 and the RAN node 220 use the second connection to exchange (i.e., transmit/receive) the buffered traffic (i.e., UL and/or DL traffic) of the first connection (see messaging 295).

Figure 3A:
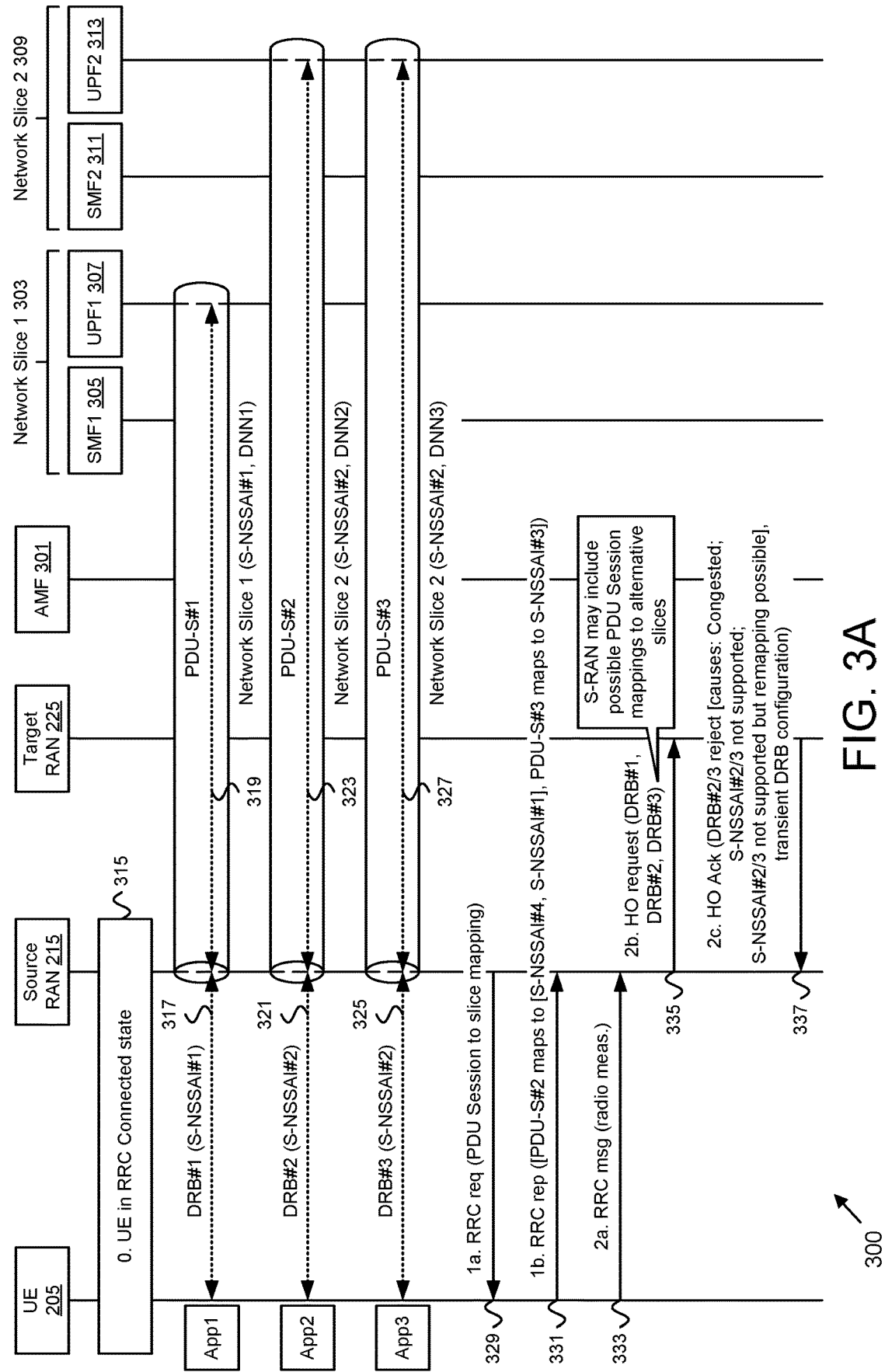
FIG. 3A is a call-flow diagram illustrating one embodiment of a Xn-based handover to a target cell not supporting all currently used network slices in the source cell.
Figure 3B:
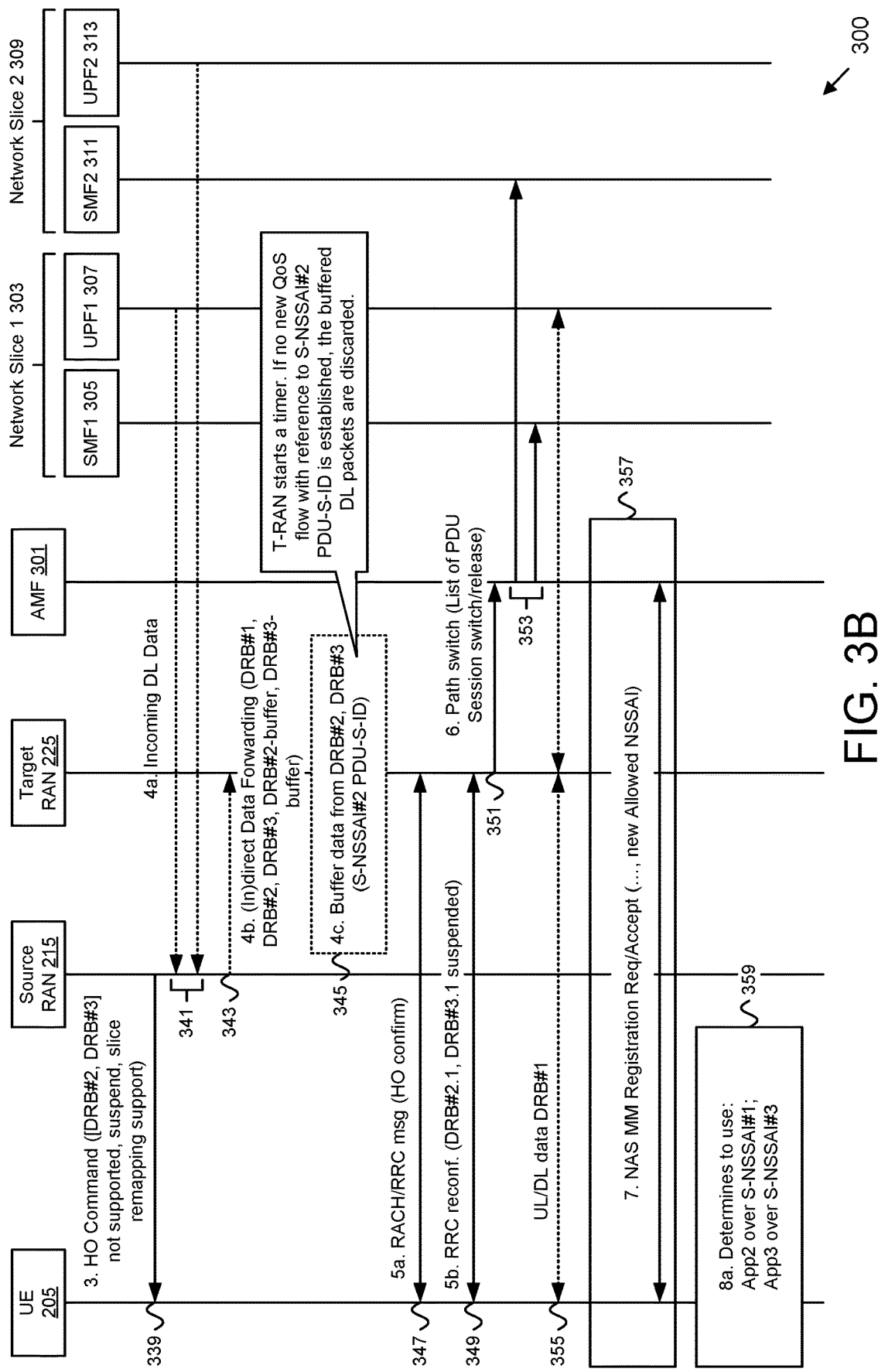
FIG. 3B is a continuation of the call-flow of FIG. 3A.
Figure 3C:
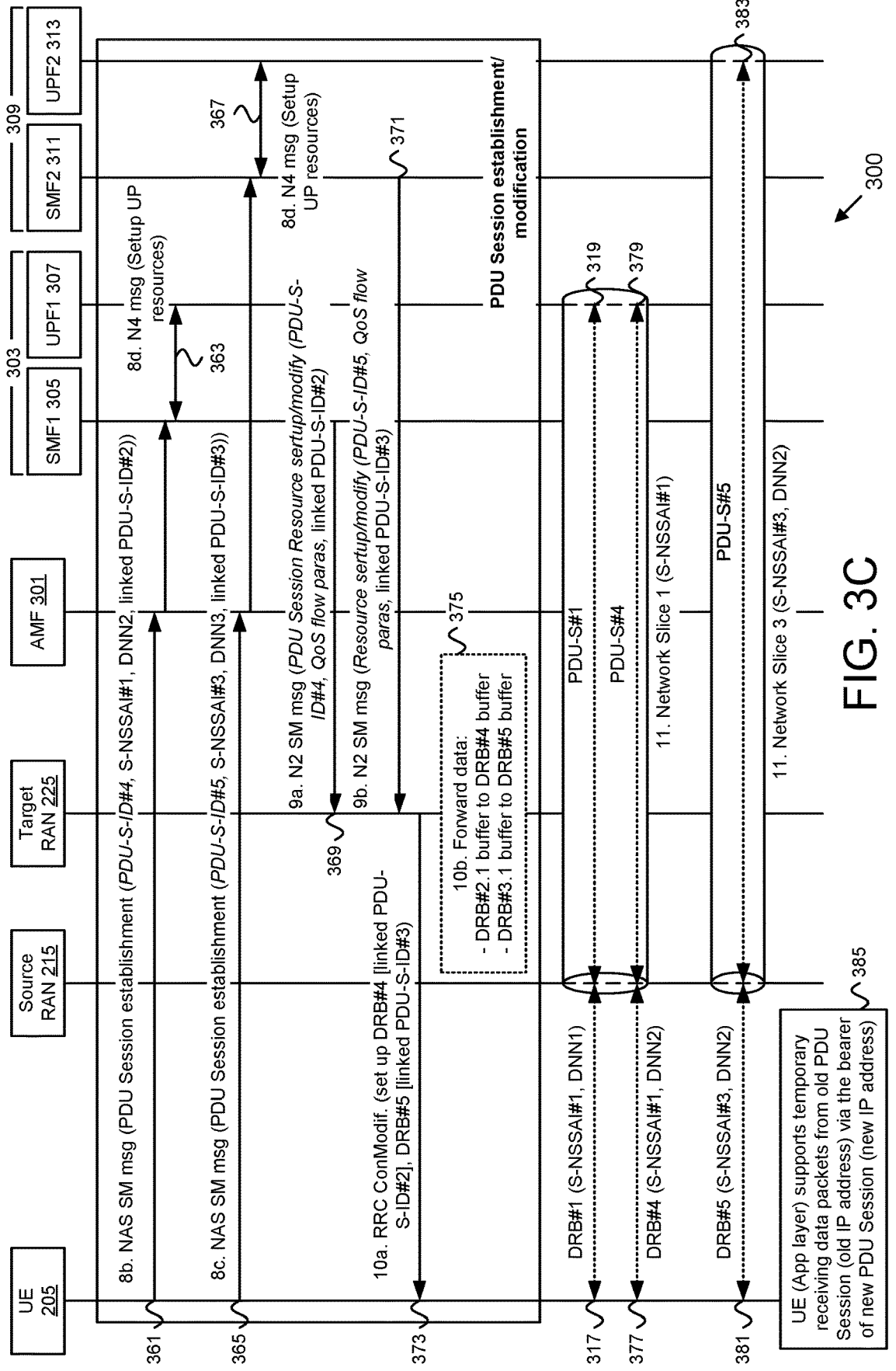
FIG. 3C is a continuation of the call-flow of FIGS. 3A and 3B.

FIG. 3A-3C depict call-flow for a procedure 300 for remapping traffic between network slices during handover, according to embodiments of the disclosure. The procedure 300 is based on a Xn-based handover to a target cell not supporting all currently used network slices in the source cell; however, the procedure 300 is also applicable to N2-based handover via AMF. Note that FIG. 3B is a continuation of the call-flow of FIG. 3A and FIG. 3C is a continuation of the call-flow of FIGS. 3A and 3B.

The procedure 300 involves the UE 205, the Source RAN ("S-RAN") 215, the Target RAN ("T-RAN") 225, an AMF 301, a first network slice 303 comprising a first SMF (denoted "SMF1") 305 and a first UPF (denoted ("UPF1") 307, and a second network slice 309 comprising a second SMF (denoted "SMF2") 311 and a second UPF (denoted ("UPF2") 313. The AMF 301 may be one embodiment of the AMF 143, the SMF1 305 and SMF2 311 may be embodiments of the SMF 145, and the UPF1 307 and UPF2 313 may be embodiments of the UPF 141. The overall traffic re-mapping procedure is shown on FIGS. 3A-3C when the UE moves from the source RAN ("S-RAN") to the target RAN ("T-RAN"). The detailed description of the steps in the procedure 300 is as follows:

Beginning on FIG. 3A, at Step 0, as a precondition, the UE 205 is in RRC-Connected state in the source RAN, i.e., in a source cell. It is assumed that there are 3 activated DRBs:

DRB #1 317 for PDU Session #1 319 associated with S-NSSAI #1 and DNN1. This PDU Session #1 319 (denoted "PDU-S #1") is used by application 1 (denoted "App1").

DRB #2 321 for PDU Session #2 323 associated with S-NSSAI #2 and DNN2. This PDU Session #2 323 (denoted "PDU-S #2") is used by application 2 (denoted "App2").

DRB #3 325 for PDU Session #3 327 associated with S-NSSAI #2 and DNN3. This PDU Session #3 327 (denoted "PDU-S #3") is used by Application #3 (denoted "App3").

At Step 1a, the Source RAN 215 may request the UE 205 at least one of: 1) the radio capabilities related to support of traffic re-mapping to another PDU Session and 2) about the possible mapping of each of the activated PDU Sessions to alternative network slices (see messaging 329). For example, the RAN node may send a Radio Resource Control ("RRC") request message including request for particular radio capability, e.g., traffic (PDU Session) re-mapping.

At Step 1b, the UE 205 may use the URSP rules to determine the alternative S-NSSAI(s) to which each of the activated PDU Sessions can be mapped. Internally in the UE 205, after the AS layer receives the request from the source RAN 215, the AS layer may request the NAS layer to provide the alternative slice (i.e., PDU Session mapping to alternative network slices) information. For example, based on the Table 1 example, the UE 205 may determine the alternative network slices from the URSP rules:

PDU-S #2 maps to S-NSSAI #4, S-NSSAI #1; and

PDU-S #3 maps S-NSSAI #3.

The UE 205 sends in an RRC response message the determined 'active PDU Sessions to alternative network slice mapping' information to the source RAN 215 (e.g., S-RAN node) (see messaging 331). Note that for convenience such information is called "PDU Session mapping" info. The source RAN 215 (e.g., S-RAN node) stores the "PDU Session mapping" information in the UE AS context and may use it during RRC-Connected state mobility.

At Step 2a, upon radio measurement report from the UE 205 (see messaging 333) or other internal means, the S-RAN node may decide to trigger a handover procedure to a target RAN 225.

In the Step 2b, the S-RAN 215 initiates handover preparation procedure towards the T-RAN 225 (see messaging 335). The S-RAN 215 may include possible active PDU Sessions mapping to alternative slices in the Handover request message to the T-RAN 225. The S-RAN node may include such "PDU Session mapping" information considering the following conditions:

If the S-RAN 215 is aware that the T-RAN 225 belongs to a different tracking area ("TA") or the T-RAN 225 serves different network slices, then send the "PDU Session mapping" info.

If the S-RAN 215 is aware that the T-RAN 225 belongs to the same TA or support the same set of network slices, the S-RAN 215 may decide to omit sending the "PDU Session mapping" info.

In Step 2c, the T-RAN 225 may evaluate whether the slices of the DRBs from the S-RAN 215 are supported in the T-RAN 225, and if not, whether the alternative slice(s) can be supported. The T-RAN 225 sends to the S-RAN 215 a Handover acknowledge message (HANDOVER REQUEST ACKNOWLEDGE message) including RRCReconfiguration message (see messaging 337). The RRCReconfiguration message include at least the target cell ID and in addition at least for each requested DRB a new configuration or rejection. The DRB rejection may include an appropriate cause value, e.g., DRB #2/DRB #3 reject [cause values: S-NSSAI #2/S-NSSAI #3 not supported, S-NSSAI #2/S-NSSAI #3 not supported but remapping is possible, or S-NSSAI #2/S-NSSAI #3 Congested].

The cause value "S-NSSAI #2/S-NSSAI #3 not supported" is meant to indicate that the slices are not supported, and no remapping is possible. The cause value "S-NSSAI #2/S-NSSAI #3 not supported but remapping is possible" is meant to indicate that the slices are not available, but the traffic can be remapped to alternative network slices. The cause value "S-NSSAI #2/S-NSSAI #3 congested" is meant to indicate that the DRB QoS may be reduced or the DRB may be rejected without remapping.

Figure 4A:
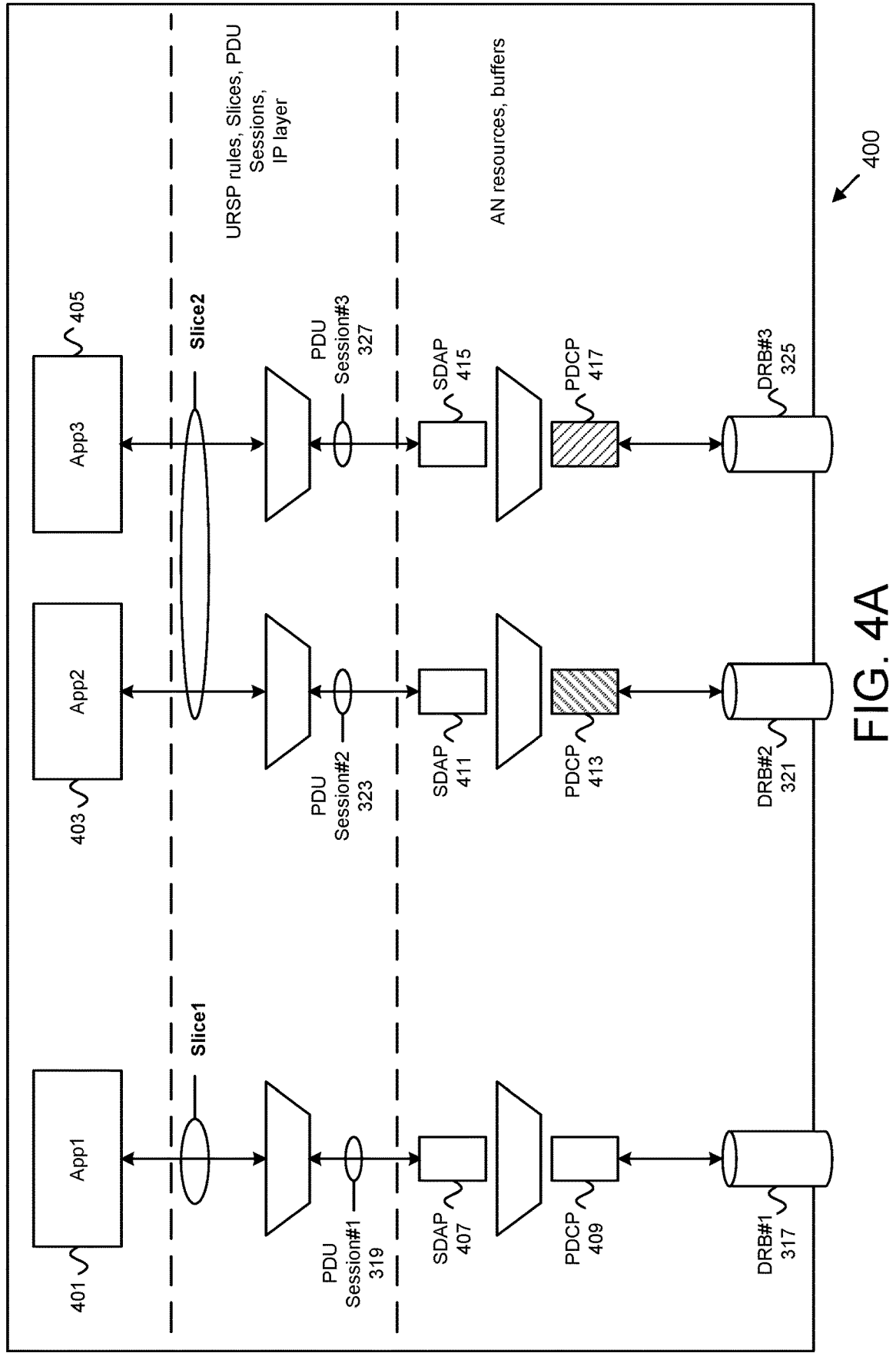
FIG. 4A is a block diagram illustrating a first embodiment of elements of the Access Stratum ("AS") during the handover procedure depicted in FIGS. 3A-3C.
Figure 4B:
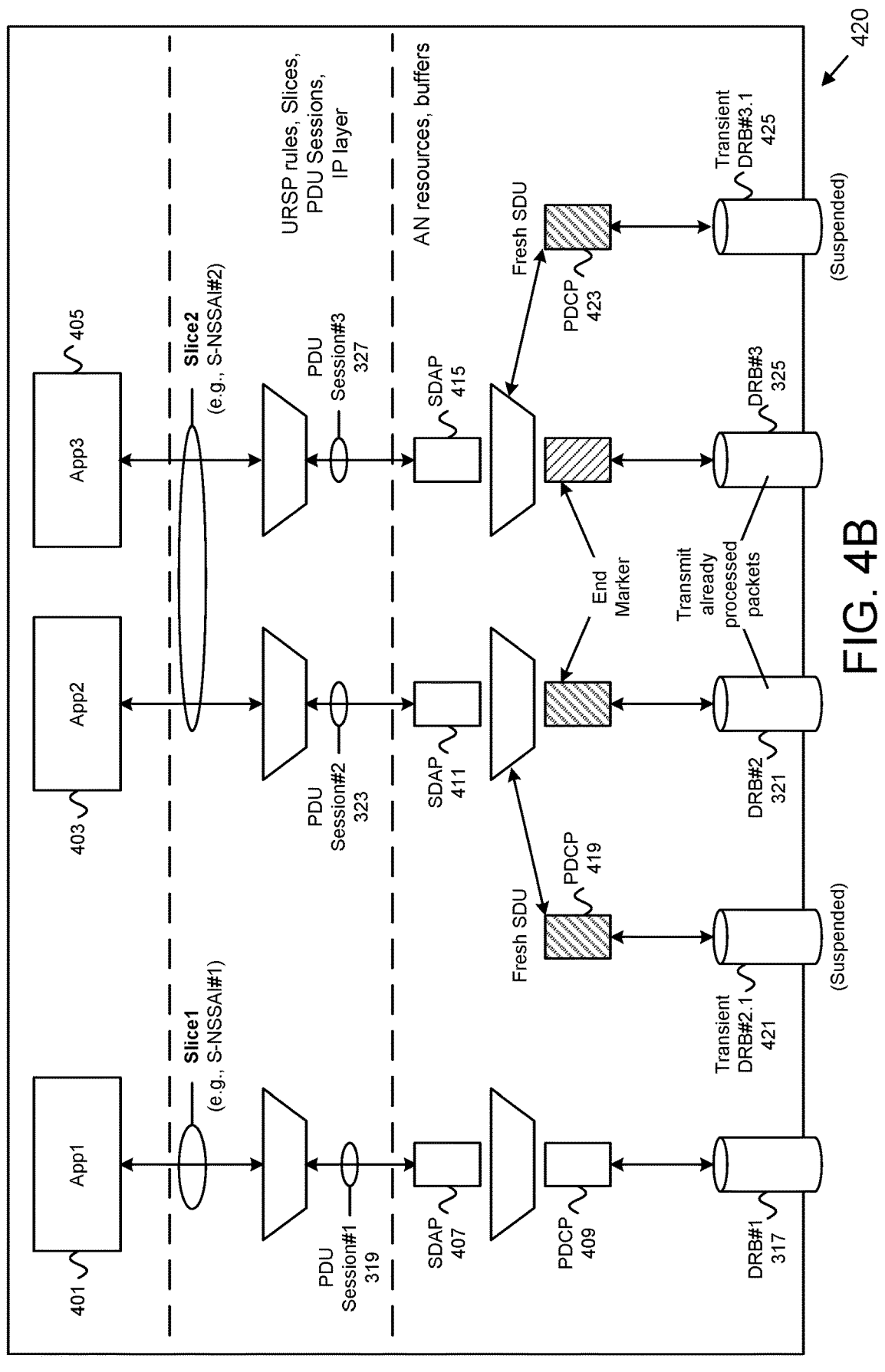
FIG. 4B is a block diagram illustrating a second embodiment of elements of the AS during the handover procedure depicted in FIGS. 3A-3C.

In the particular example from Step 1b, the T-RAN 225 can decide that traffic from S-RAN DRB #2 321 may be mapped on S-NSSAI #1 in the T-RAN 225; and traffic from S-RAN DRB #3 325 may be mapped on S-NSSAI #3 in the T-RAN 225. For this purpose, the T-RAN 225 may determine to set-up transient radio bearer DRB #2.1 and transient radio bearer DRB #3.1. The details about the transient DRBs are described in FIG. 4A-4C. The T-RAN 225 may associate the transient DRBs with the PDU Session IDs used in the S-RAN 215.

Continuing on FIG. 3B, at Step 3, resulting from Step 2c, the S-RAN 215 sends a Handover command message to the UE including the RRCReconfiguration message as received from the T-RAN 225 (see messaging 339). The Handover command message (e.g., the RRCReconfiguration message) may contain new information about the reason for DRB #2/DRB #3 rejection, e.g., rejected due to slice unavailability in the T-RAN 225 but the traffic can be remapped to alternative network slices. In addition to informing the UE 205, the T-RAN 225 may also inform the S-RAN 215 that the T-RAN 225 supports traffic and PDU Session remapping to alternative network slices. Note that the above information (i.e., DRB rejected due to slice unavailability in the T-RAN 225, but the traffic can be remapped to alternative network slices) can be included in the RRCReconfiguration message from T-RAN/S-RAN to the UE 205 and/or in the Xn message from T-RAN 225 to the S-RAN 215 (from Step 2c).

At Steps 4a and 4b, upon reception of the above information in the S-RAN 215 (via Xn/X2 Handover acknowledge message 337 or via N2 interface) regarding slice unavailability and traffic remapping support, the S-RAN 215 also forwards the incoming DL data of DRB #2 and DRB #3 to the T-RAN 225 (see messaging 341 and 343). Note that the S-RAN 215 forwards incoming DL data for DRB #1 to the T-RAN 225 due to S-NSSAI #1 being available in the T-RAN 225. Alternatively, the T-RAN 225 may not inform the S-RAN 215 about the non-support of the S-NSSAI #2, and instead the T-RAN 225 sends information to the S-RAN 215 that the DRB #2 and DRB #3 are admitted in the T-RAN 225 and the S-RAN 215 should forward the DL packets to the T-RAN 225.

At Step 4c, the T-RAN 225 buffers data from DRB #2 and DRB #3 (see block 345). When buffering, the T-RAN 225 starts a timer. If no new QoS flow with reference to S-NSSAI #2 PDU-S-ID is established before the timer expires, then the T-RAN 225 will discard any buffered DL packets associated with DRB #2 or DRB #3.

Note that upon reception of the slice unavailability and traffic remapping support information in the UE 205 (via receiving the RRCReconfiguration message from the T-RAN 225), the UE 205 establishes transient DRB(s) (e.g., DRB #2.1 and DRB #3.1) and buffers UL packets in the Packet Data Convergence Protocol ("PDCP") layer.

In addition, the RAN (e.g., T-RAN 225) can send to the UE 205 a timer value, during which the packets of DRB #2 or DRB #3 can be buffered in the network. Particularly this means to the UE 205 that if no alternative PDU Session is established within this timer value, the network may drop/delete the data packets.

At Step 5a, the UE 205 performs Random-Access Channel ("RACH") procedure in the target cell and establishes an RRC connection with the T-RAN 225 (see messaging 347). The T-RAN 225 performs RRC Reconfiguration procedure to configure the DRBs in the target cell.

In Step 5b, (if not sent in Step 2c and 4a, or in addition to these steps) the T-RAN 225 configures the transient radio bearers, e.g., DRB #2.1 and DRB #3.1, associated correspondingly with the DRB #2 and DRB #3 in the source cell (see messaging 349). The T-RAN 225 sets the DRB #2.1 and DRB #3.1 to suspended (or transient) state. The T-RAN 225 may associate the DRB #2.1 with the (rejected) PDU Session ID #2 (e.g., PDU-S-ID #2) and the DRB #3.1 with the (rejected) PDU Session ID #3 (e.g., PDU-S-ID #3) and correspondingly signal this association to the UE 205. The T-RAN 225 does not send DL packets (e.g., received from the S-RAN 215), but buffers the packets in the PDCP buffer of DRB #2.1 and DRB #3.1.

At Step 6, the T-RAN 225 performs a Path switch procedure with the AMF 301 in order to establish new N3 tunnel(s) with the CN for the handed-over DRBs, e.g., DRB #1 (see messaging 351). The T-RAN may include the list of PDU Session to be switched and a list of PDU Sessions to be released. Afterwards, a new N3 tunnel between the T-RAN 225 and UPFs for each switched PDU Session is established (see messaging 353) and the data packets flow in UL and DL over the new N3 tunnel(s) (see messaging 355).

At Step 7, the UE 205 may perform a NAS MM Registration procedure (see block 357) from the T-RAN 225 in order to register with a new set of network slices (e.g., S-NSSAI #1 and S-NSSAI #3). The Registration accept message may contain new Allowed NSSAI including a new set of S-NSSAIs. In the particular example, the Allowed NSSAI contains S-NSSAI #1 and S-NSSAI #3 available in the T-RAN 225.

At Step 8, after the Registration procedure, in Step Bathe UE 205 determines, based on the Allowed NSSAI containing S-NSSAI #1 and S-NSSAI #3, to map the traffic of App2 to S-NSSAI #1 and map the traffic of App3 to S-NSSAI #3 (see block 359).

Continuing on FIG. 3C, in Step 8b, the UE 205 may determine that new PDU Session over S-NSSAI #1 needs to be established for the traffic which has used PDU Session ID #2 in the S-RAN 215. For this purpose, the UE 205 sends NAS SM msg (PDU Session establishment request (PDU Session ID #4, S-NSSAI #1, DNN2, linked PDU-S-ID #2)) whereas the "linked PDU-S-ID #2" means the linked PDU Session ID of the old PDU Session used in the S-RAN area (see messaging 361).

In Step 8c, the UE 205 may determine that new PDU Session over S-NSSAI #3 needs to be established for the traffic which has used PDU Session ID #3 in the S-RAN 215. For this purpose, the UE 205 sends NAS SM msg (PDU Session establishment request (PDU Session ID #5, S-NSSAI #3, DNN3, linked PDU-S-ID #3)) including the linked PDU Session ID of the old PDU Session, i.e., linked PDU-S-ID #3 (see messaging 365).

In Step 8d, the SMFs 305, 311 configure the User Plane resources in the UPF (see messaging 363 and 367).

At Step 9, the SMF(s) 305, 311 after processing the UE 205's request(s) to establish PDU Session(s), may reply to the UE 205 as follows: The SMF1 305 may send N2 SM message to the T-RAN 225 including e.g., (PDU Session Resource setup/modify (PDU Session ID #4, QoS flow parameters, linked PDU-S-ID #2) (see messaging 369). The SMF3 311 may send N2 SM message to the T-RAN 225 including e.g., (PDU Session Resource setup/modify (PDU Session ID #5, QoS flow parameters, linked PDU-S-ID #3) (see messaging 371).

At Step 10a, the T-RAN 225 sends in an RRC connection modification message the configuration of new DRBs (set up DRB #5 based on DRB #3.1 Pinked PDU-S-ID #31, DRB #4 based on DRB #2.1 Pinked PDU-S-ID #21 (see messaging 373). The T-RAN 225 uses the established transient (and suspended) radio bearers DRB #2.1 and DRB #3.1 as described in Step 5b. In Step 10b, the T-RAN 225 forwards data as follows: (1) DRB #2.1's buffer to DRB #4's buffer, (2) DRB #3.1's buffer to DRB #5's buffer.

At Step 11, after the handover is completed, the following setup is used:

- DRB #1 317 for PDU Session #1 319 associated with S-NSSAI #1 and DNN1. This PDU Session #1 319 (i.e., PDU-S #1) is used by App1 and was handed over from S-RAN 215;
- DRB #4 377 for PDU Session #4 379 associated with S-NSSAI #1 and DNN2. This PDU Session #4 379 (denoted "PDU-S #4") is used by App2 and was re-mapped from PDU Session #2 323;
- DRB #5 381 for PDU Session #5 383 associated with S-NSSAI #3 and DNN3. This PDU Session #5 383 (denoted "PDU-S #5") is used by App3 and was re-mapped from PDU Session #3 327;

The UE 205 (i.e., App layer) supports temporary receiving data packets from old PDU Session (old IP address) via the bearer of new PDU Session (new IP address) (see block 385). In addition, the AS layer or NAS layer may send a suspend and resume indications to the application layer to indicate whether temporary the application should stop and resume transmitting data packets during the time of handover procedure. For example, the 'suspend' indication can be sent when the Handover command message is received in the UE 205 and the 'resume' indication can be after the DRB #4 379 or DRB #5 383 establishment is completed.

The details about the AS layer in Steps 0, 4, 5, and 10 are described in further details in FIG. 4A-4C. One benefit of procedure 300 is that the data packets (i.e., the packets buffered in the AS layer (e.g., PDCP buffer) before the handover execution and the data packets coming from upper layers during the handover before the establishment of PDU Sessions 4 and 5) are not lost. These data packets can be transmitted over the new established PDU Sessions 4 and 5 and the corresponding DRB #4 379 and DRB #5 383.

Access Stratum ("AS") details at the UE 205 before, during and after the handover are shown in FIGS. 4A-4C. At the AS level, the data radio bearer ("DRB") defines the packet treatment on the radio interface (i.e., the Uu interface). A DRB serves packets with the same packet forwarding treatment. The QoS flow to DRB mapping by NG-RAN is based on QoS Flow Indicator ("QFI") and the associated QoS profiles (i.e., QoS parameters and QoS characteristics). Separate DRBs may be established for QoS flows requiring different packet forwarding treatment, or several QoS Flows belonging to the same PDU session can be multiplexed in the same DRB.

In the uplink, the mapping of QoS Flows to DRBs is controlled by mapping rules which are signaled in two different ways. One option is Reflective mapping where, for each DRB, the UE 205 monitors the QFI(s) of the downlink packets and applies the same mapping in the uplink; that is, for a DRB, the UE 205 maps the uplink packets belonging to the QoS flows(s) corresponding to the QFI(s) and PDU Session observed in the downlink packets for that DRB. To enable this reflective mapping, the NG-RAN marks downlink packets over Uu with QFI. Another option is Explicit Configuration where QoS flow to DRB mapping rules can be explicitly signaled by RRC. The UE 205 always applies the latest update of the mapping rules regardless of whether it is performed via reflecting mapping or explicit configuration.

FIG. 4A depicts a first embodiment of Access Stratum details 400 during the handover procedure depicted in FIGS. 3A-3C. Specifically, FIG. 4A illustrates the handling of the DRBs before the handover, i.e., while the UE 205 is connected to the Source RAN ("5-RAN"). The first application ("App1") 401 is associated with the first slice (i.e., S-NSSAI #1) and the first PDU Session (i.e., PDU Session #1) 319, the second application ("App2") 403 is associated with the second slice (i.e., S-NSSAI #2) and the second PDU Session (i.e., PDU Session #2) 323, and the third application ("App3") 405 is associated with the second slice (i.e., S-NSSAI #2) and the third PDU Session (i.e., PDU Session #1) 327.

The PDU Session #1 319 and DRB #1 317 are associated with a Service Data Adaptation Protocol ("SDAP") buffer 407 and a PDCP buffer 409, the PDU Session #2 323 and DRB #2 321 are associated with an SDAP buffer 411 and a PDCP buffer 413, and the PDU Session #3 327 and DRB #3 325 are associated with an SDAP buffer 415 and a PDCP buffer 417.

FIG. 4B depicts a second embodiment of Access Stratum details 420 during the handover procedure depicted in FIGS. 3A-3C. Specifically, FIG. 4B illustrates the handling of the DRBs during the handover execution. Because the DRB #2 321 is not supported by the target RAN 225, the transient DRB #2.1 421 is established and associated with the SDAP buffer 411 belonging to the PDU Session #2 323. Accordingly, data generated by the App2 403 for the PDU Session 2 323 (i.e., fresh Service Data Units ("SDUs")) are stored in a new PDCP buffer 419 associated with the transient DRB #2.1 421. As used herein, Protocol Data Units ("PDUs") refer to packets exchanged between peer entities in the same layer, while Service Data Units ("SDUs") refer to packets handed to a lower layer by an upper layer. A PDU is typically a SDU with an additional header or trailer that carries information needed by that layer's protocol, i.e., the SDU is encapsulated in the PDU.

Because the DRB #3 325 is not supported by the target RAN 225, the transient DRB #3.1 425 is established and associated with the SDAP buffer 415 belonging to the PDU Session #3 327. Accordingly, data generated by the App3 405 for the PDU Session #3 327 (i.e., fresh SDUs) are stored in a new PDCP buffer 423 associated with the transient DRB #3.1 425. Note that the transient DRB #2.1 421 and the transient DRB #3.1 425 are in the suspended state at this phase of the handover.

The DRB #2 321 and DRB #3 325 transmit the already processed packets (i.e., PDUs). Additionally, an end marker is generated (i.e., end-marker control PDU) to indicate the last of the data associated with the source DRBs (i.e., DRB #2 321 and DRB #3 325). As described in greater detail below, the source DRBs are maintained until the end marker of each source DRB is transmitted.

Figure 4C:
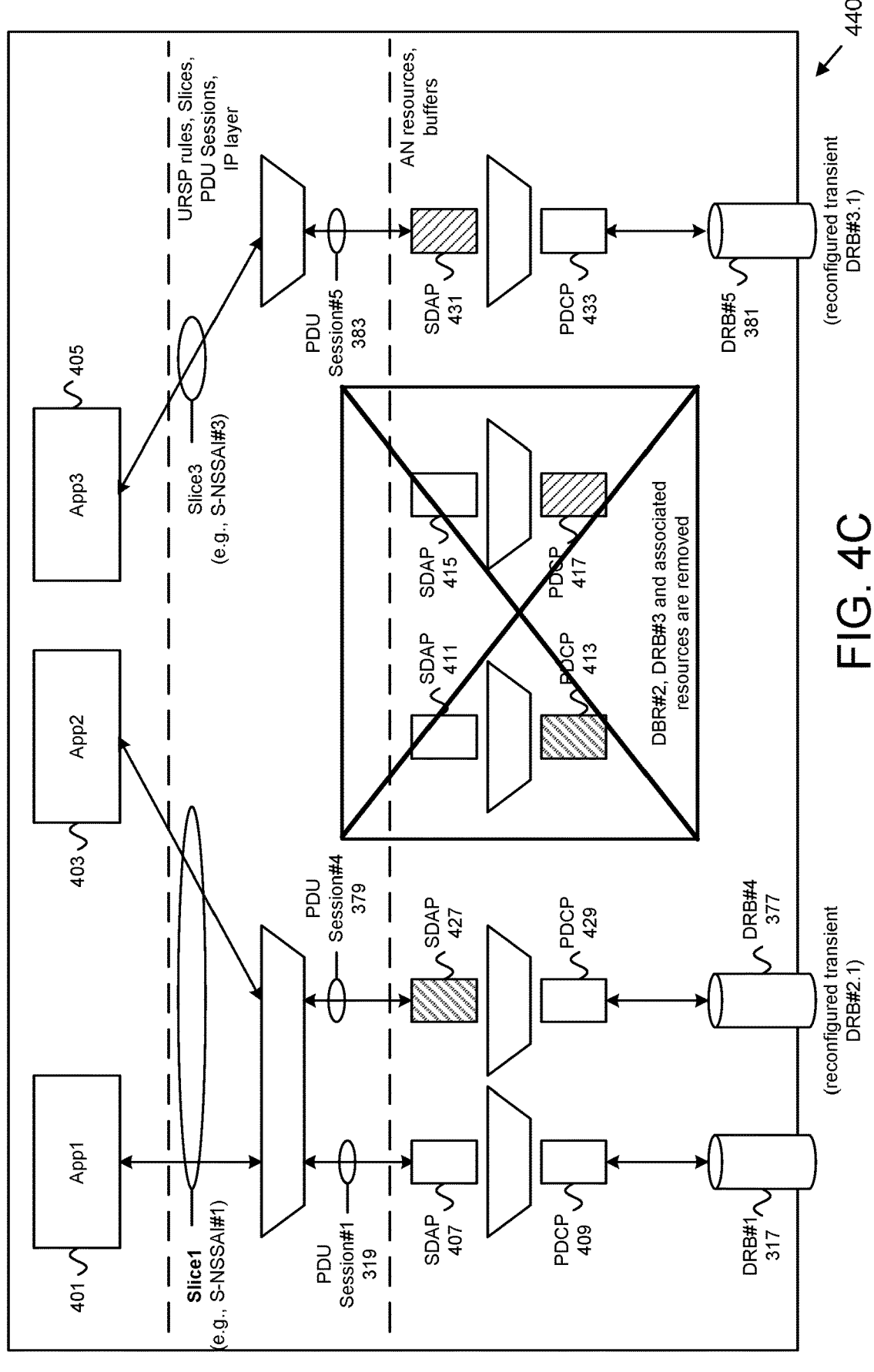
FIG. 4C is a block diagram illustrating a third embodiment of elements of the AS during the handover procedure depicted in FIGS. 3A-3C.

FIG. 4C depicts a third embodiment of Access Stratum details 440 during the handover procedure depicted in FIGS. 3A-3C. Specifically, FIG. 4C illustrates the handling of the DRBs after the handover, i.e., while the UE 205 is connected to the Target RAN ("T-RAN"). Here, the fourth PDU Session (i.e., PDU Session #4) 379 and fifth PDU Session (i.e., PDU Session #5) 383 are established. The transient DRB #2.1 421 is reconfigured into the DRB #4 377 and the transient DRB #3.1 425 is reconfigured into the DRB #5 381. The PDU Session #4 379 and DRB #4 377 are associated with an SDAP buffer 427 and a PDCP buffer 429, and the PDU Session #5 383 and DRB #3 381 are associated with an SDAP buffer 431 and a PDCP buffer 433.

After the handover, the first application ("App1") 401 is associated with the first slice (i.e., S-NSSAI #1) and the first PDU Session (i.e., PDU Session #1) 319, the second application ("App2") 403 is associated with the first slice (i.e., S-NSSAI #1) and the PDU Session #4 379, and the third application ("App3") 405 is associated with the third slice (i.e., S-NSSAI #3) and the PDU Session #5 383.

According to one embodiment, a procedure is disclosed which ensures service continuity, i.e., lossless delivery, for cases when a PDU session which is established in the UE in a source cell is not supported in a target RAN at handover. In a scenario where a slice to which an application/PDU session is currently mapped (in the source cell) is not supported in a target cell at handover, this PDU session needs to be dropped in the target cell.

According to one implementation of the embodiment, the network ("NW," i.e., RAN and/or CN) configures during handover ("HO") in addition to the source DRB, i.e., DRB which carries data packets of the QoS flow which belongs to the PDU session supported in the source cell, a second DRB, also referred to as transient DRB. The QoS flow to DRB mapping rule is updated by the NW during handover, i.e., QoS flow is mapped in the target cell to the new transient DRB. The function of such transient DRB is according to one implementation of the embodiment to buffer the new data packets arriving from the upper layer (e.g., IP layer) after the handover in the target cell. The transient DRB is only used for a limited period of time, e.g., transient period, in the target RAN/cell until the PDU session which needs to be dropped due to a slice not being supported in the target cell is reestablished (e.g., established in the target cell) and mapped to an allowed/supported slide.

It should be noted that according to one implementation of the embodiment the NW configures the new transient DRB to be in a suspended mode. Suspended mode should be understood within the scope of this disclosure as a mode of operation where PDCP SDUs arriving from the upper layer (e.g., IP layer) are stored in the PDCP layer and not further processed, i.e., PDCP SDUs are not formed into PDCP PDUs and submitted to lower layer. The source DRB, is used to transmit the already processed data packets, e.g., PDCP PDUs, to the target cell. According to one aspect of the embodiment the UE sends an end-marker control PDU, i.e., SDAP control PDU, on the source DRB to the target cell after handover.

According to one implementation UE determines whether the QoS flow to DRB mapping rule instructed by the NW during handover is different from the current stored QoS flow to DRB mapping rule for the QoS flow. In response to determining that the QoS flow to DRB mapping rule is different from the stored QoS flow to DRB mapping rule for the QoS flow, the UE constructs an end-marker control PDU, e.g., SDAP control PDU, for the QoS flow, maps the end-marker control PDU to the source DRB according to the stored QoS flow to DRB mapping rule, and submits the end-marker control PDU to the lower layers. In the UL, the target gNB should not deliver data of the QoS flow from the new DRB to 5GC before receiving the end marker on the source DRB from the UE.

In response to the UE requesting to the CN a PDU session establishment or modification of existing PDU session for the purpose of (re)mapping the application/service which was mapped to a slice not supported in the target cell to another slice in the target cell according to the URSP rules, the NW instructs the UE to reconfigure the transient DRB and to link the reconfigured DRB to the newly established or modified PDU session.

According to one implementation of the embodiment the NW configures to the UE to resume the DRB after reconfiguration. Upon reception of the Reconfiguration message, UE starts transmission and reception of data packets on the reconfigured DRB. More in particular, UE considers the PDCP SDUs stored during the transient period for the transient DRB as received from upper layer and performs transmission of the PDCP SDUs according to the legacy defined procedures.

The source DRB is according to one aspect of this embodiment removed after the transmission of the remaining packets including the end-marker control PDU has been finalized. More in particular NW orders to the UE to remove the source DRB, e.g., upon successful reception of the end-marker control PDU. According to one specific implementation of this embodiment, the transient DRB is a default DRB.

Regarding buffering in the SDAP layer, according to another embodiment, a UE stores IP packets for a QoS flow arriving from the higher layer (e.g., IP layer) in a transmission buffer in the SDAP protocol entity in response to receiving an indication from NW during handover, e.g., HO command, that the slice to which the PDU session of the QoS flow was mapped in the source cell/RAN is not supported in the target RAN/cell. In a scenario where a slice to which an application/PDU session is currently mapped (in the source cell) is not supported in a target cell at handover, this PDU session needs to be dropped in the target cell. According to one is implementation of the embodiment, UE does not process the IP packets, e.g., SDAP SDUs, received from upper layer and stored at the SDAP transmission buffer and does not deliver SDAP PDUs to lower layer (PDCP entity). The UE sends according to one implementation a request to CN in the target cell to modify the existing PDU session wherein the request includes the linked ID of the PDU session which can't be supported in the target cell due to the unavailability of the slice. The NW may in response to the request modify the PDU session, e.g., map it to a supported slice in the target cell considering the URSP rules defined for the UE and instruct the UE to establish a new DRB which is linked to the modified PDU session. According to one implementation of the embodiment, UE upon reception of the signaling message from the NW instructing to establish the new DRB starts processing the SDAP SDUs stored in the transmission buffer at SDAP layer and delivers the SDAP PDUs to lower layer, e.g., PDCP layer of the newly established DRB.

According to one implementation of this embodiment NW establishes in the target RAN/cell also the source DRB. Similar to the first embodiment the source DRB, is used to transmit the already processed data packets, e.g., PDCP PDUs, to the target cell. According to one aspect of the embodiment the UE sends an end-marker control PDU, i.e., SDAP control PDU, on the source DRB to the target cell after handover. In an alternative implementation the source DRB is not established in the target cell and packets which were already stored in PDCP/RLC layer prior to the HO are discarded and consequently lost.

Regarding moving data from source DRB to target DRB, according to one implementation, UE moves data packets, e.g., PDCP SDUs, which are stored in the Layer 2 protocols of one radio bearer to another bearer and transmits those data packets over the other bearer. For scenarios where a UE receives an indication from NW during handover, e.g., HO command, that the slice to which a PDU session of the QoS flow was mapped in the source cell/RAN is not supported in the target RAN/cell such retransmission mechanism across different radio bearers, e.g., data radio bearers, prevents the loss of data. For cases where a slice to which an application/PDU session is currently mapped (in the source cell) is not supported in a target cell at handover, the radio bearer which carried the data of this application/PDU session in the source cell prior to the HO, e.g., also referred to as source DRB, can't be supported in the target cell. In order to prevent the loss of data caused by the unavailability of slices, the NW instructs the UE according to one implementation of the embodiment to establish the source DRB in the target cell and at the same time to suspend this source DRB. Suspended mode should be understood within the scope of this disclosure as a mode of operation where PDCP SDUs arriving from the upper layer (e.g., IP layer) are stored in the PDCP layer and not further processed, i.e., PDCP SDUs are not formed into PDCP PDUs and submitted to lower layer. Furthermore, no transmission/reception of data packets over the Uu interface is performed for a suspended bearer.

In response to the UE requesting to the CN a PDU session establishment or modification of existing PDU session for the purpose of (re)mapping the application/service which was mapped to a slice not supported in the target cell to another slice in the target cell according to the URSP rules, the NW instructs the UE to establish a DRB and to link this DRB to the newly established or modified PDU session. According to one implementation of the embodiment UE forwards data packets stored for the source DRB to the new DRB in response to having established the new DRB as instructed by the NW. More in particular, UE forwards PDCP SDUs from the source DRB to the new DRB and UE considers those forwarded PDCP SDUs as received from upper layer and performs transmission of this PDCP SDUs according to the legacy defined procedures. It should be noted that UE may forward from the first PDCP SDU for which the successful delivery of the corresponding PDCP Data PDU has not been confirmed by lower layers all the PDCP SDUs which are stored in the transmission buffer in ascending order, e.g., ascending order of the COUNT value associated to the PDCP SDU, to the new DRB. NW removes the source radio bearer in response to having forwarded those PDCP SDUs to the new DRB.

Note that in-sequence delivery between forwarded SDUs from source DRB and new fresh IP packets received from upper layer is to be ensured. This may be handled by UE implementation, for example.

Figure 5:
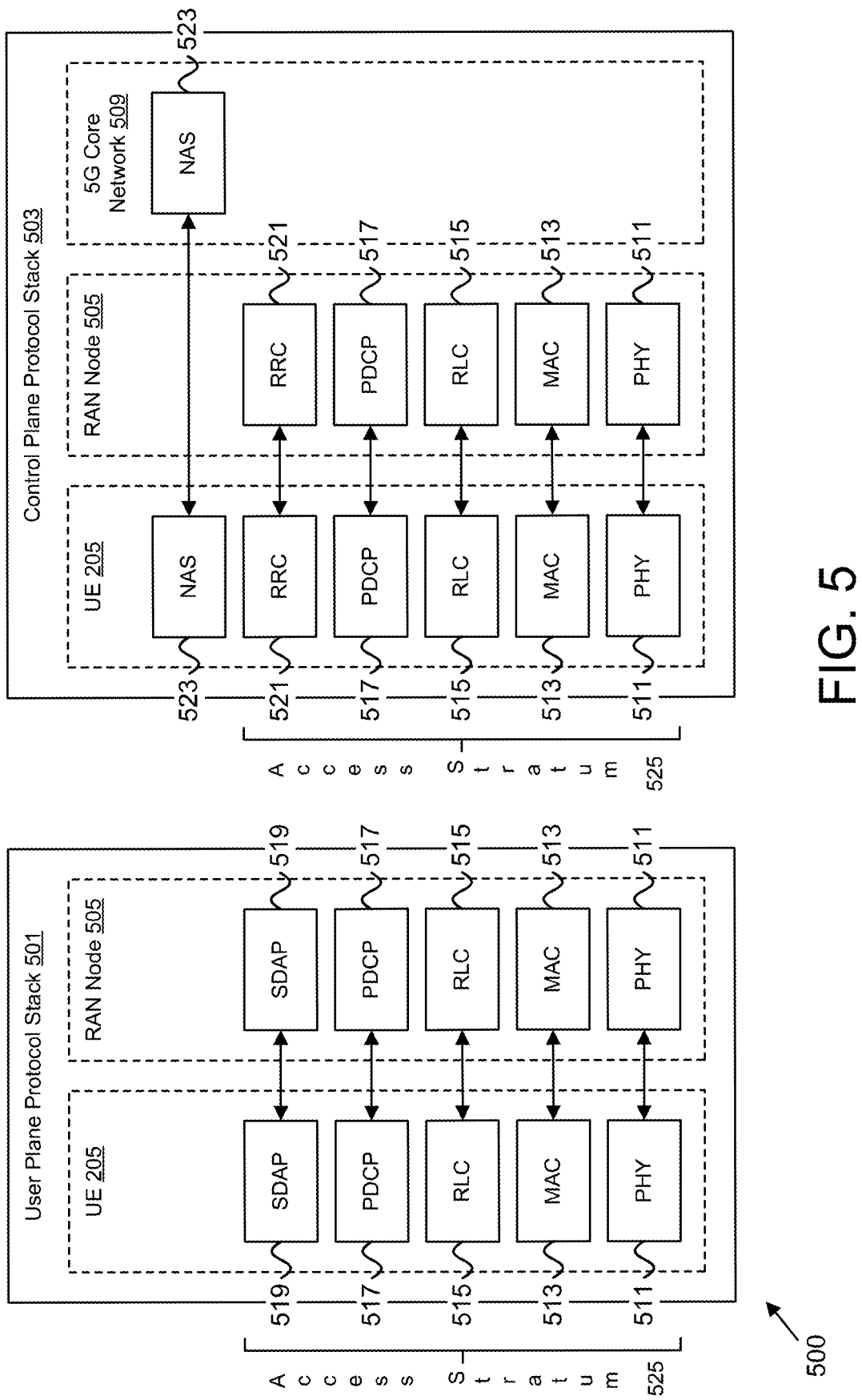
FIG. 5 is a block diagram illustrating one embodiment of a protocol stack of a UE.

FIG. 5 depicts a protocol stack 500, according to embodiments of the disclosure. While FIG. 5 shows a UE 205, a RAN node 505 and the 5G core network 509, these are representative of a set of remote units 105 interacting with a base unit 121 and a mobile core network 140. As depicted, the protocol stack 500 comprises a User Plane protocol stack 501 and a Control Plane protocol stack 503. The User Plane protocol stack 501 includes a physical ("PHY") layer 511, a Medium Access Control ("MAC") sublayer 513, the Radio Link Control ("RLC") sublayer 515, a Packet Data Convergence Protocol ("PDCP") sublayer 517, and Service Data Adaptation Protocol ("SDAP") layer 519. The Control Plane protocol stack 503 includes a physical layer 511, a MAC sublayer 513, a RLC sublayer 515, and a PDCP sublayer 517. The Control Place protocol stack 503 also includes a Radio Resource Control ("RRC") layer 521 and a Non-Access Stratum ("NAS") layer 523.

The AS layer 525 (also referred to as "AS protocol stack") for the User Plane protocol stack 501 consists of at least SDAP, PDCP, RLC and MAC sublayers, and the physical layer. The AS layer 525 for the Control Plane protocol stack 503 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 521 and the NAS layer 523 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 511 offers transport channels to the MAC sublayer 513. The MAC sublayer 513 offers logical channels to the RLC sublayer 515. The RLC sublayer 515 offers RLC channels to the PDCP sublayer 517. The PDCP sublayer 517 offers radio bearers to the SDAP sublayer 519 and/or RRC layer 521. The SDAP sublayer 519 offers QoS flows to the core network (e.g., 5GC 509). The RRC layer 521 provides for the addition, modification, and release of Carrier Aggregation and/or Dual Connectivity. The RRC layer 521 also manages the establishment, configuration, maintenance, and release of Signaling Radio Bearers ("SRBs") and Data Radio Bearers ("DRBs").

The NAS layer 523 is between the UE 205 and the 5GC 509 (i.e., AMF 301). NAS messages are passed transparently through the RAN. The NAS layer 523 is used to manage the establishment of communication sessions and for maintaining continuous communications with the UE 205 as it moves between different cells of the RAN. In contrast, the AS layer 525 is between the UE 205 and the RAN (i.e., RAN node 210) and carries information over the wireless portion of the network.

US 12,581,374 B2

23

Figure 6:
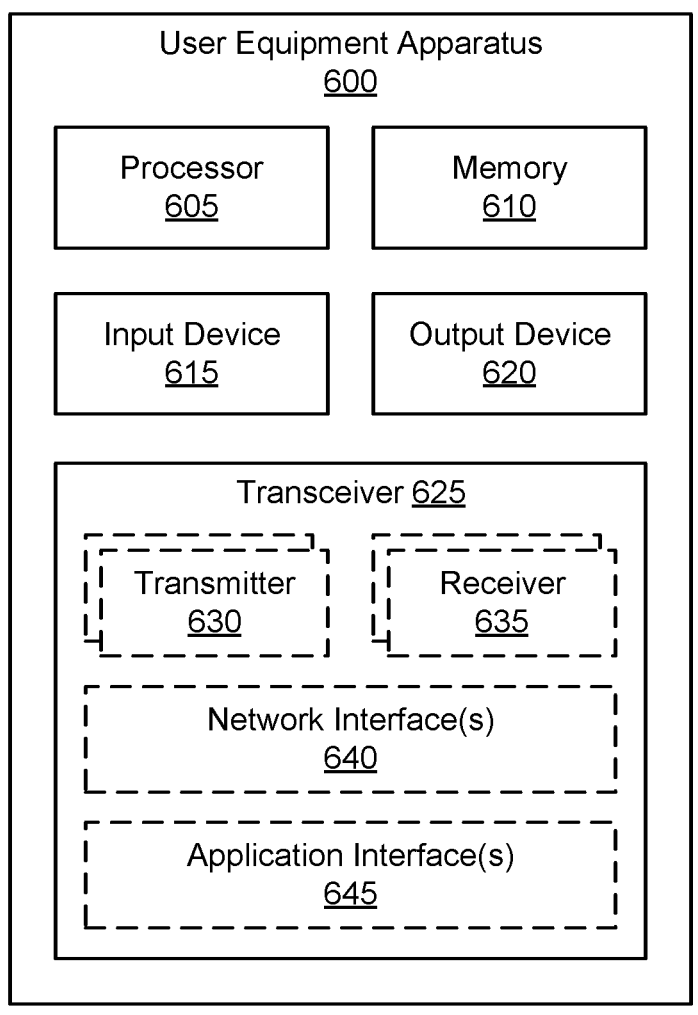
FIG. 6 is a diagram illustrating one embodiment of a user equipment apparatus that may be used for remapping traffic between network slices during a handover.

FIG. 6 depicts a user equipment apparatus 600 that may be used for remapping traffic between network slices during handover, according to embodiments of the disclosure. In various embodiments, the user equipment apparatus 600 is used to implement one or more of the solutions described above. The user equipment apparatus 600 may be one embodiment of the remote unit 105 and/or the UE 205, described above. Furthermore, the user equipment apparatus 600 may include a processor 605, a memory 610, an input device 615, an output device 620, and a transceiver 625.

In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. In some embodiments, the transceiver 625 communicates with one or more cells (or wireless coverage areas) supported by one or more base units 121. In various embodiments, the transceiver 625 is operable on unlicensed spectrum. Moreover, the transceiver 625 may include multiple UE panels supporting one or more beams. Additionally, the transceiver 625 may support at least one network interface 640 and/or application interface 645. The application interface(s) 645 may support one or more APIs. The network interface(s) 640 may support 3GPP reference points, such as Uu, N1, PCS, etc. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the user equipment apparatus 600 to implement the above described UE behaviors. In certain embodiments, the processor 605 may include an application processor (also known as "main processor") which manages application-domain and operating system ("OS") functions and a baseband processor (also known as "baseband radio processor") which manages radio functions.

In various embodiments, the processor 605 controls the transceiver 625 to receive (e.g., via an air/radio interface) a first message (e.g., handover command) indicating that a currently used first connection identified by a first identifier (e.g., PDU Session #2 associated with DRB #2 and S-NS-SAI #2) is not supported in a target RAN. Here, the first connection is established with a first network slice and the first message indicates that buffering-and-forwarding of data traffic of the first connection is supported. The transceiver 625 transmits a request to establish a second connection with a second network slice (e.g., new PDU Session establishment or modifying existing PDU Session to a different network slice S-NS SAI #1) over the Target RAN and receives a second message (e.g., RRC Connection Modification request) from the Target RAN for establishing the second connection. Here, the request includes an identifier of the second connection and the first identifier of the first connection and the second message includes the first identifier of the first connection. The processor 605 communicates at least one buffered data packet of the first connection over the second connection (i.e., once established).

In some embodiments, communicating the at least one buffered data packet from the first connection over the second connection includes maintaining a PDCP buffer of the first connection. In certain embodiments, the processor 605 does not immediately release the PDCP buffer of the first connection after receiving the first message.

In some embodiments, communicating the at least one buffered data packet from the first connection over the second connection includes establishing a first transient DRB associated with a first DRB of the first connection, where the first transient DRB is in a suspended state and buffers uplink data traffic. In such embodiments, the processor reconfigures the transient DRB to become a second DRB for the second connection.

In some embodiments, communicating the at least one buffered data packet from the first connection over the second connection includes forwarding to a DRB of the second connection one or more buffered packets and sending an end marker in the DRB of the first connection in response to forwarding the one or more buffered packets.

In some embodiments, the processor exchanges a capability to support of temporary buffering-and-forwarding of data traffic for a first connection (i.e., associated with a first network slice) in the source RAN over a second connection (i.e., associated with a second network slice) in the target RAN. In one embodiment, said capability is transmitted (or received) with the source RAN (i.e., via AS signaling). In another embodiment, said capability is transmitted (or received) with the CN (i.e., via NAS signaling).

In some embodiments, the processor 605 processes data traffic at an application layer using the first connection and the second connection. The processor 605 suspends—at the application layer—the transmission of data packets in response to receiving a suspend indication from a lower layer (e.g., AS layer or NAS layer sends the suspend indication in response to the first message) and resumes—at the application layer—the transmission of data packets in response to receiving a resume indication from the lower layer (e.g., when establishment of DRB #4 or DRB #5 is completed).

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to remapping traffic between network slices during handover and/or mobile operation. For example, the memory 610 may store various parameters, panel/beam configurations, resource assignments, policies, and the like as described above. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touch-screen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dash-board, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver 625 (or portions thereof) at particular times in order to send and receive messages.

The transceiver 625 includes at least transmitter 630 and at least one receiver 635. One or more transmitters 630 may be used to provide UL communication signals to a base unit 121, such as the UL transmissions described herein. Similarly, one or more receivers 635 may be used to receive DL communication signals from the base unit 121, as described herein. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
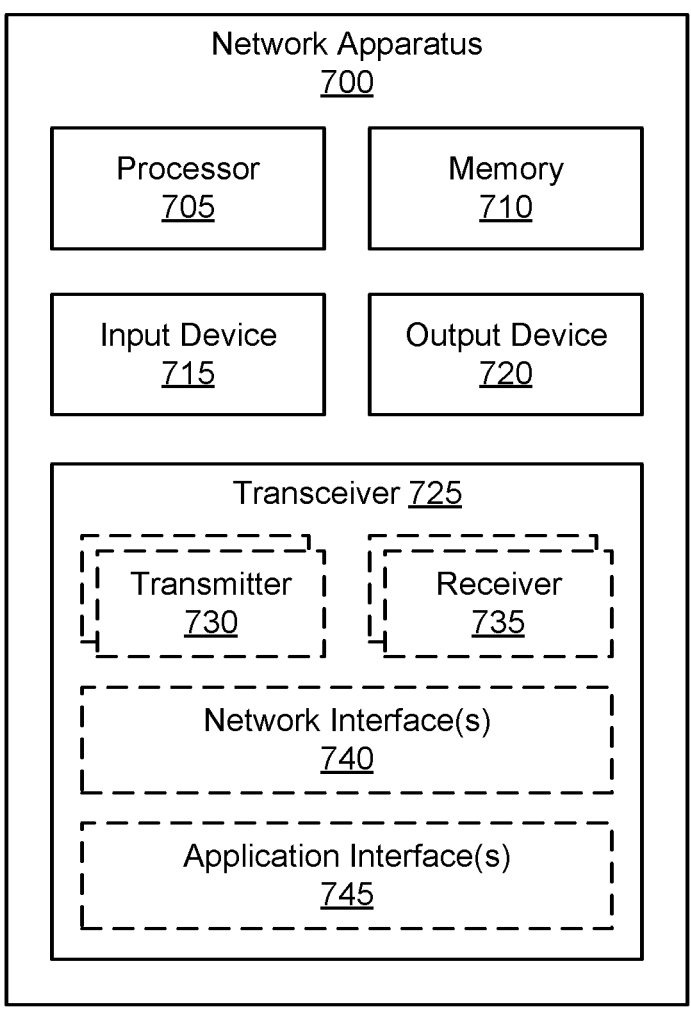
FIG. 7 is a diagram illustrating one embodiment of a network equipment apparatus that may be used for remapping traffic between network slices during a handover.

FIG. 7 depicts a network apparatus 700 that may be used for remapping traffic between network slices during handover, according to embodiments of the disclosure. In one embodiment, network apparatus 700 may be one implementation of an evaluation device, such as the base unit 121, the RAN node 210, and/or the RAN node 220, as described above. Furthermore, the network apparatus 700 may include a processor 705, a memory 710, an input device 715, an output device 720, and a transceiver 725.

In some embodiments, the input device 715 and the output device 720 are combined into a single device, such as a touchscreen. In certain embodiments, the network apparatus 700 may not include any input device 715 and/or output device 720. In various embodiments, the network apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. Here, the transceiver 725 communicates with one or more remote units 105. Additionally, the transceiver 725 may support at least one network interface 740 and/or application interface 745. The application interface(s) 745 may support one or more APIs. The network interface(s) 740 may support 3GPP reference points, such as Uu, N1, N2 and N3. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a CPU, a GPU, an auxiliary processing unit, a FPGA, or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the network apparatus 700 is a RAN node (e.g., gNB) that communicates with one or more UEs, as described herein. In such embodiments, the processor 705 controls the network apparatus 700 to perform the above described RAN behaviors. When operating as a RAN node, the processor 705 may include an application processor (also known as "main processor") which manages application-domain and operating system ("OS") functions and a baseband processor (also known as "baseband radio processor") which manages radio functions.

In various embodiments, the processor 705 controls the apparatus 700 to implement the above Source RAN functions. In some embodiments, the transceiver 725 sends (e.g., via a network interface 740) a first message (e.g., a handover request) to a Target RAN, where the first message indicates a set of connections (e.g., DRBs) established with a UE to be handed over to the Target RAN.

The transceiver 725 receives a second message (e.g., a handover response) from the Target RAN, the second message indicating that a first connection of the UE (e.g., PDU Session #2 associated with DRB #2 to S-NSSAI #2) is not supported in the Target RAN, where the first connection is established with a first network slice. The transceiver 725 sends (e.g., via an air/radio interface) a third message (e.g., a handover command) to the UE, the third message indicates that the first connection is not supported in the Target RAN and/or that buffering-and-forwarding of data traffic of the first connection is supported. Note that a single indication "buffering-and-forwarding supported" may have the meaning of both the first connection not being supported in the Target RAN and that buffering-and-forwarding of data traffic of the first connection is supported. The processor 705 forwards downlink traffic of the first connection to the Target RAN.

In some embodiments, the transceiver 725 further sends a first request to the UE that requests radio capabilities for traffic session buffering-and-forwarding to another connection and also requests mapping of active connections (e.g., PDU sessions) associated with a network slice to alternative network slices. In such embodiments, the transceiver 725 further receives a first response from the UE that contains the requested radio capabilities and session mapping information. In certain embodiments, the first message includes the session mapping information, and the second message indicates whether the first connection of the UE can be remapped.

In various embodiments, the processor 705 controls the apparatus 700 to implement the above Target RAN functions. In some embodiments, the transceiver 725 receives (e.g., via a network interface 740) a first message (e.g., a handover request) from a Source RAN, the first message indicating a set of connections (e.g., DRBs) established with a UE to be handed over from the Source RAN. The processor 705 determines that a first connection of the UE (e.g., DRB #2 to S-NSSAI #2) is not supported in the Target RAN and that the traffic of the first connection of the UE can be buffered and forwarded (i.e., over a potential second connection of the UE), where the first connection is established with a first network slice. The transceiver 725 sends a second message (e.g., a handover response) to the Source RAN, the second message indicating that a first connection (e.g., DRB

2 to S-NSSAI #2) is not supported in the Target RAN and that the traffic of the first connection of the UE can be buffered and forwarded.

The transceiver 725 receives a request from a core network entity (e.g., from SMF1/SMF3) to establish a second connection (e.g., new PDU Session establishment or modifying existing PDU Session), where the second connection is established with a second network slice. Here, the request includes an identifier of the second connection and an identifier of the first connection. The transceiver 725 sends (e.g., via an air/radio interface) a third message (e.g., RRC Connection Modification request) to the UE for establishing the second connection, where the third message includes the identifier of the second connection and the identifier of the first connection. Further, the processor 705 communicates (i.e., receives and transmits) at least one buffered data packet of the first connection over the second connection (i.e., once established).

In some embodiments, the transceiver 725 further receives downlink traffic of the first connection from the Source RAN, where communicating the at least one buffered data packet of the first connection over the second connection includes sending the received downlink traffic to the UE. In some embodiments, the transceiver 725 further transmits a timer value to the UE, where the timer value indicates a maximum time during which downlink traffic is to be buffered at the Target RAN.

In some embodiments, communicating the at least one buffered data packet from the first connection over the second connection includes establishing a first transient DRB associated with a first DRB of the first connection, where the first transient DRB is in a suspended state and buffers downlink data traffic. In such embodiments, the processor 705 indicates to the UE the association between first transient DRB and first DRB of the first connection.

In some embodiments, communicating the at least one buffered data packet from the first connection over the second connection includes: A) receiving one or more buffered uplink packets from the UE; B) receiving an end marker in a DRB of the first connection; and C) forwarding the one or more buffered uplink packets to a core network in response to receiving the end marker.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to remapping traffic between network slices during handover and/or mobile operation. For example, the memory 710 may store parameters, configurations, resource assignments, policies, and the like, as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the network apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. One or more transmitters 730 may be used to communicate with the UE, as described herein. Similarly, one or more receivers 735 may be used to communicate with network functions in the Public Land Mobile Network ("PLMN") and/or RAN, as described herein. Although only one transmitter 730 and one receiver 735 are illustrated, the network apparatus 700 may have any suitable number of transmitters 730 and receivers 735. Further, the transmitter(s) 730 and the receiver(s) 735 may be any suitable type of transmitters and receivers.

FIG. 8 depicts one embodiment of a method 800 for remapping traffic between network slices during handover, according to embodiments of the disclosure. In various embodiments, the method 800 is performed by a UE device, such as the remote unit 105, the UE 205, and/or the user equipment apparatus 600, described above as described above. In some embodiments, the method 800 is performed by a processor, such as a microcontroller, a microprocessor, a CPU, a GPU, an auxiliary processing unit, a FPGA, or the like.

The method 800 begins and receives 805 a first message (e.g., handover command) indicating that a currently used first connection identified by a first identifier (e.g., PDU Session #2 associated with DRB #2 and S-NSSAI #2) is not supported in a target RAN. Here, the first connection is established with a first network slice and the first message indicates that buffering-and-forwarding of data traffic of the first connection is supported. The method 800 includes transmitting 810 a request to establish a second connection with a second network slice (e.g., new PDU Session establishment or modifying existing PDU Session to a different network slice S-NSSAI #1) over the Target RAN. Here, the request includes an identifier of the second connection and the first identifier of the first connection. The method 800 includes receiving 815 a second message (e.g., RRC Connection Modification request) from the Target RAN for establishing the second connection. Here, the second message includes the first identifier of the first connection. The method 800 includes communicating 820 (i.e., receiving and transmitting) at least one buffered data packet of the first connection over the second connection (i.e., once established). The method 800 ends.

FIG. 9 depicts one embodiment of a method 900 for remapping traffic between network slices during handover, according to embodiments of the disclosure. In various embodiments, the method 900 is performed by a RAN entity in a source RAN, such as the base unit 121, the RAN node 210, and/or the network apparatus 700, described above as described above. In some embodiments, the method 900 is performed by a processor, such as a microcontroller, a microprocessor, a CPU, a GPU, an auxiliary processing unit, a FPGA, or the like.

The method 900 begins and sends 905 a first message (e.g., a handover request) to a Target RAN, the first message indicating a set of connections (e.g., DRBs) established with a UE to be handed over to the Target RAN. The method 900 includes receiving 910 a second message (e.g., a handover response) from the Target RAN, the second message indicating that a first connection of the UE (e.g., PDU Session #2 associated with DRB #2 to S-NSSAI #2) is not supported in the Target RAN, where the first connection is established with a first network slice. The method 900 includes sending 915 a third message (e.g., a handover command) to the UE, the third message indicating that the first connection is not supported in the Target RAN and/or that buffering-and-forwarding of data traffic of the first connection is supported. The method 900 includes forwarding 920 downlink traffic of the first connection to the Target RAN. The method 900 ends.

FIG. 10 depicts one embodiment of a method 1000 for remapping traffic between network slices during handover, according to embodiments of the disclosure. In various embodiments, the method 1000 is performed by a RAN entity in a Target RAN, such as the base unit 121, the RAN node 220, and/or the network apparatus 700, described above as described above. In some embodiments, the method 1000 is performed by a processor, such as a microcontroller, a microprocessor, a CPU, a GPU, an auxiliary processing unit, a FPGA, or the like.

The method 1000 begins and receives 1005 a first message (e.g., a handover request) from a Source RAN, the first message indicating a set of connections (e.g., DRBs) established with a UE to be handed over from the Source RAN. The method 1000 includes determining 1010 that a first connection of the UE (e.g., DRB #2 to S-NSSAI #2) is not supported in the Target RAN and that the traffic of the first connection of the UE can be buffered and forwarded (i.e., over a potential second connection of the UE), where the first connection is established with a first network slice. The method 1000 includes sending 1015 a second message (e.g., a handover response) to the Source RAN, the second message indicating that a first connection (e.g., DRB #2 to S-NSSAI #2) is not supported in the Target RAN and that the traffic of the first connection of the UE can be buffered and forwarded.

The method 1000 includes receiving 1020 a request from a core network entity (e.g., from SMF1/SMF3) to establish a second connection (e.g., new PDU Session establishment or modifying existing PDU Session), where the second connection is established with a second network slice. Here, the request includes an identifier of the second connection and an identifier of the first connection. The method 1000 includes sending 1025 a third message (e.g., RRC Connection Modification request) to the UE for establishing the second connection, where the third message includes the identifier of the second connection and the identifier of the first connection. The method 1000 includes communicating 1030 (i.e., receiving and transmitting) at least one buffered data packet of the first connection over the second connection (i.e., once established). The method 1000 ends.

Disclosed herein is a first apparatus for remapping traffic between network slices during handover, according to embodiments of the disclosure. The first apparatus may be implemented by a UE device, such as the remote unit 105, the UE 205, and/or the user equipment apparatus 600, described above. The first apparatus includes a processor and a transceiver that receives a first message (e.g., handover command) indicating that a currently used first connection identified by a first identifier (e.g., PDU Session #2 associated with DRB #2 and S-NSSAI #2) is not supported in a target RAN. Here, the first connection is established with a first network slice and the first message indicates that buffering-and-forwarding of data traffic of the first connection is supported.

The transceiver transmits a request to establish a second connection with a second network slice (e.g., new PDU Session establishment or modifying existing PDU Session to a different network slice S-NSSAI #1) over the Target RAN and receives a second message (e.g., RRC Connection Modification request) from the Target RAN for establishing the second connection. Here, the request includes an identifier of the second connection and the first identifier of the first connection and the second message includes the first identifier of the first connection. The processor communicates at least one buffered data packet of the first connection over the second connection (i.e., once established).

In some embodiments, communicating the at least one buffered data packet from the first connection over the second connection includes maintaining a PDCP buffer of the first connection. In certain embodiments, the processor does not immediately release the PDCP buffer of the first connection after receiving the first message.

In some embodiments, communicating the at least one buffered data packet from the first connection over the second connection includes establishing a first transient DRB associated with a first DRB of the first connection, where the first transient DRB is in a suspended state and buffers uplink data traffic. In such embodiments, the processor reconfigures the transient DRB to become a second DRB for the second connection.

In some embodiments, communicating the at least one buffered data packet from the first connection over the second connection includes forwarding to a DRB of the second connection one or more buffered packets and sending an end marker in the DRB of the first connection in response to forwarding the one or more buffered packets.

In some embodiments, the processor exchanges a capability to support of temporary buffering-and-forwarding of data traffic for a first connection (i.e., associated with a first network slice) in the source RAN over a second connection (i.e., associated with a second network slice) in the target RAN. In one embodiment, said capability is transmitted (or received) with the source RAN (i.e., via AS signaling). In another embodiment, said capability is transmitted (or received) with the CN (i.e., via NAS signaling).

In some embodiments, the processor further: A) processes data traffic at an application layer using the first connection and the second connection; B) suspends at the application layer the transmission of data packets in response to receiving a suspend indication from a lower layer (e.g., AS layer or NAS layer sends the suspend indication in response to the first message); and C) resumes, at the application layer, the transmission of data packets in response to receiving a resume indication from the lower layer (e.g., when establishment of DRB #4 or DRB #5 is completed).

Disclosed herein is a first method for remapping traffic between network slices during handover, according to embodiments of the disclosure. The first method may be performed by a UE device, such as the remote unit 105, the UE 205, and/or the user equipment apparatus 600, described above. The first method includes receiving a first message (e.g., handover command) indicating that a currently used first connection identified by a first identifier (e.g., PDU Session #2 associated with DRB #2 and S-NSSAI #2) is not supported in a target RAN. Here, the first connection is established with a first network slice and the first message indicates that buffering-and-forwarding of data traffic of the first connection is supported.

The first method includes transmitting a request to establish a second connection with a second network slice (e.g., new PDU Session establishment or modifying existing PDU Session to a different network slice S-NSSAI #1) over the Target RAN and receiving a second message (e.g., RRC Connection Modification request) from the Target RAN for establishing the second connection. Here, the request includes an identifier of the second connection and the first identifier of the first connection and the second message includes the first identifier of the first connection. The first method includes communicating (i.e., receiving and transmitting) at least one buffered data packet of the first connection over the second connection (i.e., once established).

In some embodiments, communicating the at least one buffered data packet from the first connection over the second connection includes maintaining a PDCP buffer of the first connection (i.e., the UE does not immediately release the PDCP buffer of the first connection after receiving the first message).

In some embodiments, communicating the at least one buffered data packet from the first connection over the second connection includes establishing a first transient DRB associated with a first DRB of the first connection, where the first transient DRB is in a suspended state and buffers uplink data traffic. In such embodiments, the first method includes reconfiguring the transient DRB to become a second DRB for the second connection.

In some embodiments, communicating the at least one buffered data packet from the first connection over the second connection includes forwarding to a DRB of the second connection one or more buffered packets and sending an end marker in the DRB of the first connection in response to forwarding the one or more buffered packets.

In some embodiments, the first method includes exchanging a capability to support of temporary buffering-and-forwarding of data traffic for a first connection (i.e., associated with a first network slice) in the source RAN over a second connection (i.e., associated with a second network slice) in the target RAN. In one embodiment, said capability is transmitted (or received) with the source RAN (via AS signaling) In another embodiment, said capability is transmitted (or received) with the CN (via NAS signaling).

In some embodiments, the first method includes: A) processing data traffic at an application layer using the first connection and the second connection; B) suspending at the application layer the transmission of data packets in response to receiving a suspend indication from a lower layer (e.g., AS layer or NAS layer sends the suspend indication in response to the first message); and C) resuming, at the application layer, the transmission of data packets in response to receiving a resume indication from the lower layer (e.g., when establishment of DRB #4 or DRB #5 is completed).

Disclosed herein is a second apparatus for remapping traffic between network slices during handover, according to embodiments of the disclosure. The second apparatus may be implemented by a RAN entity in a source RAN, such as the base unit 121, the RAN node 210, and/or the network apparatus 700, described above. The second apparatus includes a processor and a transceiver that sends a first message (e.g., a handover request) to a Target RAN, the first message indicating a set of connections (e.g., DRBs) established with a UE to be handed over to the Target RAN.

The transceiver receives a second message (e.g., a handover response) from the Target RAN, the second message indicating that a first connection of the UE (e.g., PDU Session #2 associated with DRB #2 to S-NSSAI #2) is not supported in the Target RAN, where the first connection is established with a first network slice. The transceiver sends a third message (e.g., a handover command) to the UE, the third message indicates that the first connection is not supported in the Target RAN and/or that buffering-and-forwarding of data traffic of the first connection is supported. The processor forwards downlink traffic of the first connection to the Target RAN.

In some embodiments, the transceiver further sends a first request to the UE that requests radio capabilities for traffic session buffering-and-forwarding to another connection and also requests mapping of active connections (e.g., PDU sessions) associated with a network slice to alternative network slices. In such embodiments, the transceiver further receives a first response from the UE that contains the requested radio capabilities and session mapping information. In certain embodiments, the first message includes the session mapping information, and the second message indicates whether the first connection of the UE can be remapped.

Disclosed herein is a second method for remapping traffic between network slices during handover, according to embodiments of the disclosure. The second method may be performed by a RAN entity in a source RAN, such as the base unit 121, the RAN node 210, and/or the network apparatus 700, described above. The second method includes sending a first message (e.g., a handover request) to a Target RAN, the first message indicating a set of connections (e.g., DRBs) established with a UE to be handed over to the Target RAN.

The second method includes receiving a second message (e.g., a handover response) from the Target RAN, the second message indicating that a first connection of the UE (e.g., PDU Session #2 associated with DRB #2 to S-NSSAI #2) is not supported in the Target RAN, where the first connection is established with a first network slice. The second method includes sending a third message (e.g., a handover command) to the UE, the third message indicating that the first connection is not supported in the Target RAN and/or that buffering-and-forwarding of data traffic of the first connection is supported. The second method includes forwarding downlink traffic of the first connection to the Target RAN.

In some embodiments, the second method includes sending a first request to the UE that requests radio capabilities for traffic session buffering-and-forwarding to another connection and also requests mapping of active connections (e.g., PDU sessions) associated with a network slice to alternative network slices. In such embodiments, the second method also includes receiving a first response from the UE that contains the requested radio capabilities and session mapping information. In certain embodiments, the first message includes the session mapping information, and the second message indicates whether the first connection of the UE can be remapped.

Disclosed herein is a third apparatus for remapping traffic between network slices during handover, according to embodiments of the disclosure. The third apparatus may be implemented by a RAN entity in a Target RAN, such as the base unit 121, the RAN node 220, and/or the network apparatus 700, described above. The third apparatus includes a processor and a transceiver that receives a first message (e.g., a handover request) from a Source RAN, the first message indicating a set of connections (e.g., DRBs) established with a UE to be handed over from the Source RAN. The processor determines that a first connection of the UE (e.g., DRB #2 to S-NSSAI #2) is not supported in the Target RAN and that the traffic of the first connection of the UE can be buffered and forwarded (i.e., over a potential second connection of the UE), where the first connection is established with a first network slice. The transceiver sends a second message (e.g., a handover response) to the Source RAN, the second message indicating that a first connection (e.g., DRB #2 to S-NSSAI #2) is not supported in the Target RAN and that the traffic of the first connection of the UE can be buffered and forwarded.

The transceiver receives a request from a core network entity (e.g., from SMF1/SMF3) to establish a second connection (e.g., new PDU Session establishment or modifying existing PDU Session), where the second connection is established with a second network slice. Here, the request includes an identifier of the second connection and an identifier of the first connection. The transceiver sends a third message (e.g., RRC Connection Modification request) to the UE for establishing the second connection, where the third message includes the identifier of the second connection and the identifier of the first connection. Further, the processor communicates (i.e., receives and transmits) at least one buffered data packet of the first connection over the second connection (i.e., once established).

In some embodiments, the transceiver further receives downlink traffic of the first connection from the Source RAN, where communicating the at least one buffered data packet of the first connection over the second connection includes sending the received downlink traffic to the UE. In some embodiments, the transceiver further transmits a timer value to the UE, where the timer value indicates a maximum time during which downlink traffic is to be buffered at the Target RAN.

In some embodiments, communicating the at least one buffered data packet from the first connection over the second connection includes establishing a first transient DRB associated with a first DRB of the first connection, where the first transient DRB is in a suspended state and buffers downlink data traffic. In such embodiments, the processor indicates to the UE the association between first transient DRB and first DRB of the first connection.

In some embodiments, communicating the at least one buffered data packet from the first connection over the second connection includes: A) receiving one or more buffered uplink packets from the UE; B) receiving an end marker in a DRB of the first connection; and C) forwarding the one or more buffered uplink packets to a core network in response to receiving the end marker.

Disclosed herein is a third method for remapping traffic between network slices during handover, according to embodiments of the disclosure. The third method may be performed by a RAN entity in a Target RAN, such as the base unit 121, the RAN node 220, and/or the network apparatus 700, described above. The third method includes receiving a first message (e.g., a handover request) from a Source RAN, the first message indicating a set of connections (e.g., DRBs) established with a UE to be handed over from the Source RAN. The third method includes determining that a first connection of the UE (e.g., DRB #2 to S-NSSAI #2) is not supported in the Target RAN and that the traffic of the first connection of the UE can be buffered and forwarded (i.e., over a potential second connection of the UE), where the first connection is established with a first network slice. The third method includes sending a second message (e.g., a handover response) to the Source RAN, the second message indicating that a first connection (e.g., DRB #2 to S-NSSAI #2) is not supported in the Target RAN and that the traffic of the first connection of the UE can be buffered and forwarded.

The third method includes receiving a request from a core network entity (e.g., from SMF1/SMF3) to establish a second connection (e.g., new PDU Session establishment or modifying existing PDU Session), where the second connection is established with a second network slice. Here, the request includes an identifier of the second connection and an identifier of the first connection. The third method includes sending a third message (e.g., RRC Connection Modification request) to the UE for establishing the second connection, where the third message includes the identifier of the second connection and the identifier of the first connection. The third method includes communicating (i.e., receiving and transmitting) at least one buffered data packet of the first connection over the second connection (i.e., once established).

In some embodiments, the third method includes receiving downlink traffic of the first connection from the Source RAN, where communicating the at least one buffered data packet of the first connection over the second connection includes sending the received downlink traffic to the UE. In some embodiments, the third method includes sending a timer value to the UE, where the timer value indicates a maximum time during which downlink traffic is to be buffered at the Target RAN.

In some embodiments, communicating the at least one buffered data packet from the first connection over the second connection includes establishing a first transient DRB associated with a first DRB of the first connection, where the first transient DRB is in a suspended state and buffers downlink data traffic. In such embodiments, the third method includes signaling to the UE the association between first transient DRB and first DRB of the first connection.

In some embodiments, communicating the at least one buffered data packet from the first connection over the second connection includes: A) receiving one or more buffered uplink packets from the UE; B) receiving an end marker in a DRB of the first connection; and C) forwarding the one or more buffered uplink packets to a core network in response to receiving the end marker.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:
at least one memory; and
at least one processor coupled with the at least one memory and configured to cause the UE to:
receive a first message indicating that a first connection identified by a first identifier is not supported in a target radio access network ("RAN"), wherein the first connection is established with a first network slice via a source RAN, and wherein the first message indicates that buffering and forwarding of data traffic of the first connection is supported;
transmit a request to establish a second connection with a second network slice over the target RAN, wherein the request includes an identifier of the second connection and the first identifier of the first connection;
receive a second message from the target RAN for establishing the second connection, wherein the second message includes the first identifier of the first connection; and
communicate, over the second connection, at least one buffered data packet associated with the first connection.

2. The UE of claim 1, wherein to communicate the at least one buffered data packet from the first connection over the second connection, the at least one processor is configured to cause the UE to maintain a packet data convergence protocol ("PDCP") buffer of the first connection.

3. The UE of claim 1, wherein to communicate the at least one buffered data packet from the first connection over the second connection, the at least one processor is configured to cause the UE to:
establish a first transient data radio bearer ("DRB") associated with a first DRB of the first connection, wherein the first transient DRB is in a suspended state and buffers uplink data traffic, and
reconfigure the first transient DRB to become a second DRB for the second connection.

4. The UE of claim 1, wherein to communicate the at least one buffered data packet from the first connection over the second connection, the at least one processor is configured to cause the UE to:
forward one or more buffered packets to a data radio bearer ("DRB") of the second connection; and
transmit an end marker in the DRB of the first connection in response to forwarding the one or more buffered packets.

5. The UE of claim 1, wherein the at least one processor is configured to cause the UE to exchange a capability to support of temporary buffering and forwarding of data traffic for a connection in the source RAN over a connection in the target RAN.

6. The UE of claim 5, wherein the capability is transmitted at least to the source RAN or a core network ("CN").

7. The UE of claim 1, wherein the at least one processor is configured to cause the UE to:
process data traffic at an application layer using the first connection and the second connection;
suspend, at the application layer, transmission of data packets in response to receiving a suspend indication from a lower layer; and
resume, at the application layer, the transmission of data packets in response to receiving a resume indication from the lower layer.

8. A method performed by a source radio access network ("RAN") entity, the method comprising:

transmitting a first message to a target RAN, the first message indicating a set of connections established with a user equipment ("UE") to be handed over to the target RAN;

receiving a second message from the target RAN, the second message comprising an indication that a first connection of the UE is not supported in the target RAN and an indication that the target RAN supports buffering and forwarding of data traffic of the first connection, wherein the first connection is established with a first network slice;

transmitting a third message to the UE, the third message comprising an indication that the first connection is not supported in the target RAN, and an indication that buffering and forwarding of data traffic of the first connection is supported at the target RAN; and forwarding, to the target RAN, downlink traffic of the first connection which was not supported in the target RAN.

9. The method of claim 8, further comprising:

transmitting a first request to the UE that requests radio capabilities for buffering and forwarding a traffic session to another connection and also requests mapping of active connections associated with a network slice to alternative network slices; and receiving a first response from the UE that comprises the requested radio capabilities and session mapping information.

10. The method of claim 9, wherein the first message comprises the session mapping information and the second message indicates whether the first connection of the UE can be remapped.

11. A base station in a target radio access network ("RAN"), the base station comprising:

at least one memory; and at least one processor coupled with the at least one memory and configured to cause the base station to:

receive a first message from a source RAN, the first message indicating a set of connections established with a user equipment ("UE") to be handed over from the source RAN;

determine that a first connection of the UE is not supported in the target RAN and that traffic of the first connection of the UE can be buffered and forwarded, wherein the first connection is established with a first network slice;

transmit a second message to the source RAN, the second message indicating that a first connection is not supported in the target RAN and that the traffic of the first connection of the UE can be buffered and forwarded;

receive a request from a core network entity to establish a second connection, wherein the request includes an identifier of the second connection and an identifier of the first connection, wherein the second connection is established with a second network slice;

transmit a third message to the UE for establishing the second connection, wherein the third message includes the identifier of the second connection and the identifier of the first connection; and communicate, over the second connection, at least one buffered data packet associated with the first connection.

12. The base station of claim 11, wherein the at least one processor is configured to cause the UE to:

receive downlink traffic of the first connection from the source RAN, and communicate, over the second connection, the at least one buffered data packet associated with the first connection by sending the received downlink traffic to the UE.

13. The base station of claim 11, wherein the at least one processor is configured to cause the UE to transmit a timer value to the UE, wherein the timer value indicates a maximum time during which downlink traffic is to be buffered at the target RAN.

14. The base station of claim 11, wherein to communicate the at least one buffered data packet from the first connection over the second connection, the at least one processor is configured to cause the UE to:

establish a first transient data radio bearer ("DRB") associated with a first DRB of the first connection, wherein the first transient DRB is in a suspended state and buffers downlink data traffic; and indicate to the UE an association between the first transient DRB and the first DRB of the first connection.

15. The base station of claim 11, wherein to communicate the at least one buffered data packet from the first connection over the second connection, the at least one processor is configured to cause the UE to:

receive one or more buffered uplink packets from the UE;

receive an end marker in a DRB of the first connection; and forward the one or more buffered uplink packets to a core network in response to receiving the end marker.

16. A base station in a source radio access network ("RAN"), the base station comprising:

at least one memory; and at least one processor coupled with the at least one memory and configured to cause the base station to:

transmit a first message to a target RAN, the first message indicating a set of connections established with a user equipment ("UE") to be handed over to the target RAN;

receive a second message from the target RAN, the second message comprising an indication that a first connection of the UE is not supported in the target RAN and an indication that the target RAN supports buffering and forwarding of data traffic of the first connection, wherein the first connection is established with a first network slice;

transmit a third message to the UE, wherein the third message comprising an indication that the first connection is not supported in the target RAN, and an indication that buffering and forwarding of data traffic of the first connection is supported at the target RAN; and forward, to the target RAN, downlink traffic of the first connection which was not supported in the target RAN.

17. The base station of claim 16, at least one processor is configured to cause the base station to:

transmit a first request to the UE that requests radio capabilities for buffering and forwarding a traffic session to another connection and also requests mapping of active connections associated with a network slice to alternative network slices; and receive a first response from the UE that comprises the requested radio capabilities and session mapping information.

18. The base station of claim 17, wherein the first message comprises the session mapping information and the second message indicates whether the first connection of the UE can be remapped.

\* \* \* \* \*